(12) United States Patent
Wilson et al.

(10) Patent No.: US 11,113,334 B2
(45) Date of Patent: *Sep. 7, 2021

(54) SYSTEMS AND METHODS FOR IDENTIFYING GROUPS RELEVANT TO STORED OBJECTIVES AND RECOMMENDING ACTIONS

(71) Applicant: Rexter Holdings LLC, Austin, TX (US)

(72) Inventors: Andrew R. Wilson, Pasadena, CA (US); John Slade, West Hollywood, CA (US); Daniel Bouganim, Agoura Hill, CA (US); Sean L. Cramer, Los Angeles, CA (US)

(73) Assignee: Rexter Holdings LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,812

(22) Filed: Jun. 21, 2019

(65) Prior Publication Data

US 2019/0377758 A1 Dec. 12, 2019

Related U.S. Application Data

(63) Continuation of application No. 15/013,634, filed on Feb. 2, 2016, now Pat. No. 10,331,741, which is a
(Continued)

(51) Int. Cl.
*G06F 16/901* (2019.01)
*G06F 16/23* (2019.01)
(Continued)

(52) U.S. Cl.
CPC .......... *G06F 16/9024* (2019.01); *G06F 16/23* (2019.01); *G06F 16/284* (2019.01);
(Continued)

(58) Field of Classification Search
CPC ............. G06F 16/9024; G06F 16/9535; G06F 16/3322; G06F 16/23; G06F 16/284; G06Q 50/01
See application file for complete search history.

(56) References Cited

U.S. PATENT DOCUMENTS 7,539,697 B1 * 5/2009 Akella .................. H04L 51/32
8,180,804 B1 * 5/2012 Narayanan ........ G06F 16/24575
707/798

(Continued)

*Primary Examiner* — Tony Mahmoudi
*Assistant Examiner* — Umar Mian
(74) *Attorney, Agent, or Firm* — KPPB LLP

(57) ABSTRACT

Relationship management systems in accordance with embodiments of the invention are configured to provide systematic ways for a user to measure, and manage relationships in the user's social network. One embodiment of the invention includes a relationship management server system, and a database. In addition, the relationship management server system is configured to store a user account associated with a user in the database, store information concerning contacts associated with the user in the database, store event information associated with the user and at least one of the stored contacts in the database, store at least one objective in the database, score at least one relationship between the user and a contact based upon stored event information associated with the user and the contact to create a scored relationship graph, and generate a recommendation concerning an action based upon the stored objective and the scored relationship graph.

22 Claims, 18 Drawing Sheets

Related U.S. Application Data continuation of application No. 14/543,818, filed on Nov. 17, 2014, now Pat. No. 9,262,551, which is a continuation of application No. 13/311,390, filed on Dec. 5, 2011, now Pat. No. 8,892,605.

(60) Provisional application No. 61/419,741, filed on Dec. 3, 2010.

(51) Int. Cl.
    *G06F 16/28*     (2019.01)
    *G06F 16/332*     (2019.01)
    *G06F 16/9535*     (2019.01)
    *G06Q 50/00*     (2012.01)

(52) U.S. Cl.
    CPC ...... *G06F 16/3322* (2019.01); *G06F 16/9535* (2019.01); *G06Q 50/01* (2013.01)

(56) References Cited

U.S. PATENT DOCUMENTS

| | | |
|---|---|---|
| 8,700,540 B1 * | 4/2014 | Zambrano ......... G06F 16/24578 705/319 |
| 8,812,647 B1 | 8/2014 | Jain et al. |
| 8,892,605 B2 | 11/2014 | Wilson et al. |
| 8,943,151 B2 | 1/2015 | Smith et al. |
| 9,262,551 B2 | 2/2016 | Wilson et al. |
| 10,331,741 B2 | 6/2019 | Wilson et al. |
| 2006/0149731 A1 | 7/2006 | Schirmer et al. |
| 2010/0174747 A1 | 7/2010 | Farrell et al. |
| 2010/0179874 A1 | 7/2010 | Higgins et al. |
| 2010/0290603 A1 * | 11/2010 | Gemayel ............. H04L 51/34 379/93.25 |
| 2011/0004692 A1 * | 1/2011 | Occhino ............. H04L 67/16 709/228 |
| 2011/0179161 A1 | 7/2011 | Guy et al. |
| 2011/0246574 A1 * | 10/2011 | Lento ............. G06F 16/958 709/204 |
| 2011/0320380 A1 | 12/2011 | Zahn et al. |
| 2012/0001919 A1 | 1/2012 | Lumer |
| 2012/0095976 A1 | 4/2012 | Hebenthal et al. |
| 2012/0110073 A1 | 5/2012 | Chakra et al. |
| 2012/0143921 A1 | 6/2012 | Wilson et al. |
| 2014/0236663 A1 | 8/2014 | Smith et al. |
| 2015/0074148 A1 | 3/2015 | Andrew et al. |
| 2016/0019661 A1 | 1/2016 | Bouganim et al. |
| 2016/0232255 A1 | 8/2016 | Wilson et al. |

* cited by examiner

SYSTEMS AND METHODS FOR IDENTIFYING GROUPS RELEVANT TO STORED OBJECTIVES AND RECOMMENDING ACTIONS

CROSS-REFERENCE TO RELATED APPLICATIONS

The present application claims priority under 35 U.S.C. 120 as a continuation of U.S. patent application Ser. No. 15/013,634 filed Feb. 2, 2016, entitled "Systems and Methods for Identifying Groups Relevant to Stored Objectives and Recommending Actions", to Wilson et al., which application is a continuation of U.S. patent application Ser. No. 14/543,818, entitled "Systems and Methods for Recommending Actions Based Upon Stored Objectives Using Scored Relationship Graphs", to Wilson et al., filed Nov. 17, 2014, now U.S. Pat. No. 9,262,551 issued Feb. 16, 2016, which application is a continuation of U.S. patent application Ser. No. 13/311,390, entitled "Systems and Methods for Managing Social Networks Based Upon Predetermined Objectives", to Wilson et al., filed Dec. 5, 2011, now U.S. Pat. No. 8,892,605 issued Nov. 18, 2014, which application claims priority under 35 U.S.C. 119(e) to U.S. Provisional Patent Application Ser. No. 61/419,741 entitled "Systems and Methods for Managing Social Networks Based Upon Predetermined Objectives" to Wilson et al., filed Dec. 3, 2010. The disclosures of application Ser. Nos. 15/013,634, 14/543,818, 13/311,390 and 61/419,741 are incorporated by reference herein in their entirety.

FIELD OF THE INVENTION

The present invention relates generally to online social networks and more specifically to methods for managing social networks based upon predetermined objectives.

BACKGROUND

Social networks provide valuable relationships, particularly in a professional context where a social network may be leveraged for a business referral, a personal introduction, and/or the purchase of goods or services. Historically, the size of an individual's social network was constrained by the individual's ability to meet people and the effort required to maintain traditional on-going communications (e.g. in person meetings, telephone calls, mail). The advent of the social web has radically expanded the number of potential relationships an individual can maintain, while ubiquitous online communication has created a breadth of low effort communication channels (e.g. short message feeds, email, instant messaging).

SUMMARY OF THE INVENTION

Relationship management systems in accordance with embodiments of the invention are configured to provide systematic ways for a user to measure, and manage relationships in the user's social network. Relationship management systems can analyze a user's social network and provide recommendations concerning actions the user can take to strengthen relevant relationships and achieve defined objectives. Relationship management systems can also be used across workgroups and enterprises to provide team benchmarking, and a tool to support collaborative networking.

One embodiment of the invention includes a relationship management server system, and a database. In addition, the relationship management server system is configured to store a user account associated with a user in the database, store information concerning contacts associated with the user in the database, store event information associated with the user and at least one of the stored contacts in the database, store at least one objective in the database, score at least one relationship between the user and a contact based upon stored event information associated with the user and the contact to create a scored relationship graph, and generate a recommendation concerning an action based upon at least one stored objective and the scored relationship graph.

In a further embodiment of the invention, the relationship management server system is configured to obtain contact information from at least one source of contact information.

In another embodiment of the invention, at least one source of contact information is selected from the group consisting of a web mail service, an enterprise mail system, and an online social network.

In a still further embodiment of the invention, the relationship management server system is configured to obtain event information from at least one source of event information.

In still another embodiment of the invention, at least one source of event information is selected from the group consisting of a web mail service, an enterprise mail system, a web calendaring service, an enterprise calendaring system, call data records, and an online social network.

In a yet further embodiment of the invention, the objective relates to a specific project.

In yet another embodiment of the invention, the objective relates to an objective with respect to the user's relationship graph.

In a further embodiment again, the objective relates to a specific relationship.

In another embodiment again, the relationship management server system is further configured to store information characterizing at least one relationship between the user and a contact.

In a further additional embodiment, the information characterizing a relationship between the user and a contact is expressed in terms of a first value indicative of the importance of the relationship to the user, and a second value indicative of the strength of the relationship.

In another additional embodiment, the objective is expressed as a target value for the strength of a relationship.

In a still yet further embodiment, the relationship management server system is further configured to prompt the user for information characterizing at least one relationship, and the at least one relationship is selected based upon the importance of the relationship to the generation of a recommendation concerning an action based upon the stored objective and the scored relationship graph.

In still yet another embodiment, the relationship management server system is further configured to store information identifying a group of contacts associated with the objective.

In a still further embodiment again, the relationship management server system is further configured to recommend at least one contact for inclusion in the group of contacts associated with the objective.

In still another embodiment again, the relationship management server system is further configured to decrease the score assigned to a relationship between a user and a contact due to the passage of time.

In a still further additional embodiment, the relationship management server system is further configured to increase the score assigned to a relationship between a user and a contact in response to the occurrence of an event involving at least the user and the contact.

In still another additional embodiment, the relationship management server system is further configured to increase the score assigned to a relationship between a user and a contact in response to the occurrence of a telephone conversation between the user and the contact.

In a yet further embodiment again, the relationship management server system is further configured to increase the score assigned to a relationship between a user and a contact in response to the occurrence of a meeting between the user and the contact.

In yet another embodiment again, the relationship management server system is further configured to modify the score assigned to a relationship between a user and a contact in response to the user requesting a predetermined action from the contact.

In a yet further additional embodiment, the relationship management server system is further configured to score event information associated with the user and at least one of the contacts.

In yet another additional embodiment, the relationship management server system is further configured to score a relationship between a user and a contact as follows:

$$s_{x,y,t} = f\left(s_{x,y,0}, \sum_{k=0}^{t} \sum_{j_k} a(s(e_{j_k}(k)), e_{j_k}(k), t-k)\right)$$

where, $s_{x,y,t}$ the relationship score for the relationship between the user x and contact y at time t, $s_{x,y,t}$ can be a vector quantity, $e_{j_k}(k)$ is the $j_k$ th event to occur between time t=k−1 and time t=k, the function s(.) scores the value of event $e_{j_k}(k)$, the function a(.) ages the score assigned to the event $e_{j_k}(k)$ that occurred at time interval k based upon the score assigned to the event $s(e_{j_k}(k))$, the type of event $e_{j_k}(k)$, and the time t−k that has elapsed since the event occurred, and the function f(.) is a function of the initially assigned relationship score $s_{x,y,0}$, the sum of the aged event scores for all events $j_k$ that occurred at every time interval from time k=0 to time k=t involving the user x and contact y.

In a further additional embodiment again, the relationship management server system is further configured to generate a user interface displaying a list of recommendations including the generated recommendation.

In another additional embodiment again, the list of recommendations is ordered based upon the importance of each recommendation to the stored objective.

In a still yet further embodiment again, the stored objective is one of a plurality of stored objectives and a priority is associated with each of the plurality of stored objectives, and the list of recommendations is ordered based upon the importance of each recommendation to the highest priority objectives.

In still yet another embodiment again, the relationship management server system is further configured to index event information and contact information associated with the stored contacts.

In a still yet further additional embodiment, the relationship management server system is further configured to identify groups of related contacts using the index.

In still yet another additional embodiment, the relationship management server system is further configured to identify contacts relevant to a search query.

In a yet further additional embodiment again, the relationship management server system is further configured to store a plurality of user accounts in the database, store information concerning contacts associated with each user in the database, store event information associated with each user and at least one of the contacts associated with the user in the database, store at least one objective for each user in the database, and score the relationships between each user and the contacts associated with the user based upon stored event information associated with the user and the contact to create at least one scored relationship graph.

In yet another additional embodiment again, the at least one scored relationship graph is a many-to-many directional social graph.

In another further embodiment, the relationship management server system is further configured to generate a recommendation for a first user based upon the scored social graph of at least a second user.

In still another further embodiment, the generated recommendation includes at least one contact and a recommended relationship target for the contact.

In yet another further embodiment, the relationship management server system is further configured to benchmark the scored social graph of a first user against the scored social graph of at least a second user.

In another further embodiment again, a first user can query the relationship scores that each of a plurality of users have with a specific contact.

Another further additional embodiment includes obtaining information concerning contacts associated with a user, obtaining event information associated with the user and at least one of the contacts, and scoring at least one relationship between the user and a contact based upon the event information associated with the user and the contact to create a scored relationship graph.

Still yet another further embodiment also includes obtaining at least one objective from the user, and generating a recommendation concerning an action based upon the objective and the scored relationship graph.

BRIEF DESCRIPTION OF DRAWINGS

FIG. 13 conceptually illustrates a user interface including a call list generated by a relationship management system in accordance with an embodiment of the invention.

FIG. 14 conceptually illustrates the integration of relationship scores into the user interface of an online social network in accordance with an embodiment of the invention.

DETAILED DESCRIPTION

Figure 1:
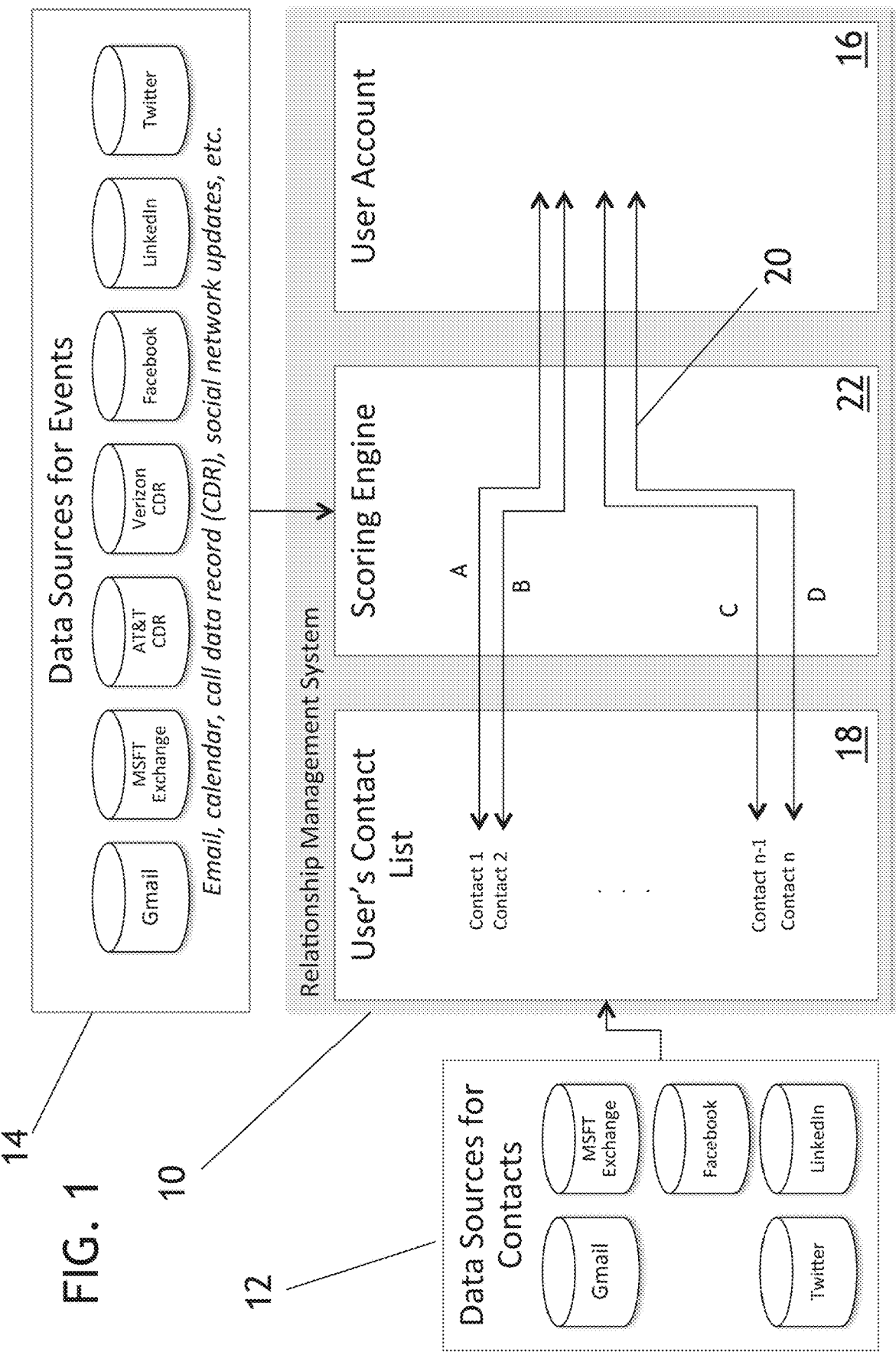
FIG. 1 is a conceptual illustration of a relationship management system in accordance with an embodiment of the invention.

Turning now to the drawings, relationship management systems and methods for managing a social network in accordance with embodiments of the invention are disclosed. Building and maintaining relationships is an extremely important activity, but relationships and the success of relationship building activities are difficult to measure. Relationship management systems in accordance with embodiments of the invention construct a social graph corresponding to a user's social network and score each of the user's relationships (i.e. the links in the social graph) based upon the aggregation and evaluation of events that impact the ongoing strength of the relationship. The scoring of a relationship can involve assigning a single or multiple scores to the relationship. By enabling the scoring of relationships, the relationship management system can provide a systematic, customized way for a user to effectively prioritize effort in the management of relationships within a social network.

In several embodiments, relationship events are scored using event metadata that is automatically collected by the relationship management system from various sources of event information. Scores based upon metadata can be further enhanced using subjective information provided by the user, sometimes in response to prompting by the relationship management system. In many embodiments, the relationship management system recommends specific relationship event scores where additional subjective tuning will provide the most information and/or be most useful to the accuracy of the relationship management system. In a number of embodiments, the user is prompted for additional subjective information when an event occurs that significantly impacts the scoring of the relationship. In this way, the relationship management system can employ user feedback to increase the likelihood that the user's scored social graph closely corresponds to the relationships the user enjoys in the real world.

In many embodiments, a user can set targets for specific relationships and/or define immediate or overarching objectives. Based upon the specified targets and/or objectives, the relationship management system can provide recommendations concerning the most effective actions the user can take to achieve specific relationship targets and/or objectives. In a number of embodiments, the relationship management system enables a user to define a specific objective and the relationship management system searches metadata associated with each contact to identify contacts relevant to the specific objective. In several embodiments, the relationship management system generates a call sheet (a prioritized list of recommended actions) that provides recommendations concerning actions that are most relevant to achieving one or more objectives. Relationship management systems can also provide recommendations concerning various aspects of the user's social network based upon data mining that compares the user's social network to the social networks of other users who may have similar occupations or are pursuing similar goals. In many embodiments, relationship management systems use machine learning and statistical techniques to infer information from user networks and observed behaviors that can be used to enhance the ability of other users to achieve their objectives. In many embodiments, relationship management systems are configured to provide recommendations concerning best practices for achieving a specific outcome with respect to a specific contact. In several embodiments, the relationship management system indexes correspondence and other communications with specific contacts and/or other data related to a contact to identify topics relevant to a specific contact. The indexed information can also be used to perform searches relating contacts to specific objectives or to specific groups.

In several embodiments, the relationship management system is implemented as a scoring engine that enables the scoring of event information collected by a third party systems such as a Customer Relationship Management (CRM) system. When a relationship management system is implemented as an extension of a CRM system in this way, the relationship management system can provide a valuable tool for building a relationship up to a point where a contact becomes a prospective customer (where they are associated with a specific opportunity) and lends itself to process tracking typically provided by CRM systems. In many embodiments, the relationship management system is integrated with online social networks and relationship scores generated by the relationship management system can be provided to the online social network for display with respect to relationships within the online social network. Relationship management systems, methods of building scored social graphs, and the use of scored social graphs to provide users with recommended actions relevant to defined goals in accordance with embodiments of the invention are discussed further below.

Relationship Management System Architectures

A variety of architectures can be utilized to implement a relationship management system in accordance with embodiments of the invention. A relationship management system in accordance with an embodiment of the invention is conceptually illustrated in FIG. 1. The relationship management system 10 is configured to connect with one or more sources of contact information 12 and one or more sources of event information 14. When a user creates a user account 16, the relationship management system 10 uses information provided by the user to retrieve contact information from the sources of contact information 12. The relationship management system uses the retrieved information to construct a contact list 18. Account information provided by the user can also be used to access sources of event information 14 and to aggregate information concerning events involving the user and one or more of the user's contacts. Based upon the aggregated contact list and the aggregated event information, the relationship management system can create a scored social graph 20 that can be utilized in the management of relationships within the user's social network.

The term social network is typically used to describe relationships that exist in the real world, whereas, the term social graph is used to describe relationships that exist online. In the social graph 20 built using the user's contact list, the links in the social graph represent relationships between the user and the user's contacts 18. The relationships may be relationships that are purely based upon online interactions, but typically also include relationships involving offline interactions such as, but not limited to, phone calls, transactions, collaborative projects, and in person meetings. In several embodiments, the relationship management system attempts to aggregate as much online contact information for a user from as many sources as possible in order to try and build a consolidated social graph 20 that is coextensive with the user's social network.

In addition to building a social graph, a scoring engine 22 within the relationship management system is configured to assign one or more scores to each relationship or link in the user's social graph based upon aggregated information concerning events that involve the user and one or more members of the user's contact list (i.e. members of the user's social graph). In many embodiments, the relationship management system 10 automatically gathers metadata concerning events from sources of event information 14. Through the collection of metadata, a relationship management system can do more than simply count events. The collected metadata describes the events, therefore, the metadata can be used by a scoring engine to score the significance of discrete events of the same type, based upon their real world importance. In several embodiments, the scoring engine utilizes metadata indicative of the type of event, the duration of the event, and the intimacy of the event in scoring the event. In other embodiments, the variety of metadata is utilized in the scoring of events is only limited by the metadata available to the relationship management system.

The scoring engine can also consider any of a variety of additional factors in assigning one or more scores to events and/or in determining the impact an event has upon an overall relationship including but not limited to the status or significance of the contact with whom the event is related. In addition to the automated gathering of event information, many relationship management systems in accordance with embodiments of the invention solicit user input with respect to specific events including subjective information concerning the importance and/or outcome of the event. In this way, the user can adjust the significance placed upon events by the scoring engine to increase the likelihood that the scored social graph generated by the relationship management system closely corresponds with the relationships that the user enjoys within the user's real world social network.

Sources of contact information that can be aggregated by a relationship management system include but are not limited to remotely hosted web mail services, such as the Gmail service provided by Google, Inc. of Mountain View, Calif., contacts maintained by an enterprise mail server, such as a Microsoft Exchange server distributed by Microsoft Corporation of Redmond, Wash. or an equivalent server, and/or contact information maintained by an online social network such as the Facebook service provided by Facebook, Inc. of Palo Alto, Calif., the Twitter service provided by Twitter, Inc. of San Francisco, Calif. and/or the LinkedIn service provided by LinkedIn, Inc. of Mountain View, Calif. In a number of embodiments, information can be exported from these services in a file including but not limited to a comma separated variable file. In several embodiments, contact information is directly retrieved via an application programming interface (API). In many embodiments, the relationship management system relies upon another system, including but not limited to a CRM, to partially or completely aggregate contact information. When contact information is aggregated by a separate system, the aggregated event information can be passed to the scoring engine via an API. In several embodiments, the relationship management system is integrated with other systems and provides information including but not limited to relationship scores via an API for use by the other systems. Although specific sources of contact information are listed above, any of a variety of different sources of contact information can be interfaced with a relationship management system to enable aggregation of contact information in accordance with embodiments of the invention as appropriate to a specific user and/or application.

Sources of event information can include any of a variety of sources including email services, such as Gmail and/or a Microsoft Exchange server, call data records from mobile phones or other telephony systems, meeting and calendars, and/or social network messages, updates, postings, and/or activities on services including, but not limited to, Facebook, LinkedIn, and Twitter. In a number of embodiments, event metadata can be exported in a batch file format from these sources and/or accessed via an API. In many embodiments, event metadata is obtained from mobile devices including but not limited to smart phones configured to communicate with a relationship management system via an application installed on the mobile device. In several embodiments, the relationship management system relies upon another system, including but not limited to a CRM, to partially or completely aggregate event information. When event information is aggregated by a separate system, the aggregated event information can be passed to the scoring engine via an API. Although specific sources of event information are listed above, any of a variety of sources of event information can be interfaced with a relationship management system in accordance with embodiments of the invention to enable the aggregation of event information as appropriate to a specific user and/or application.

Implementing Relationship Management Systems

Figure 2:
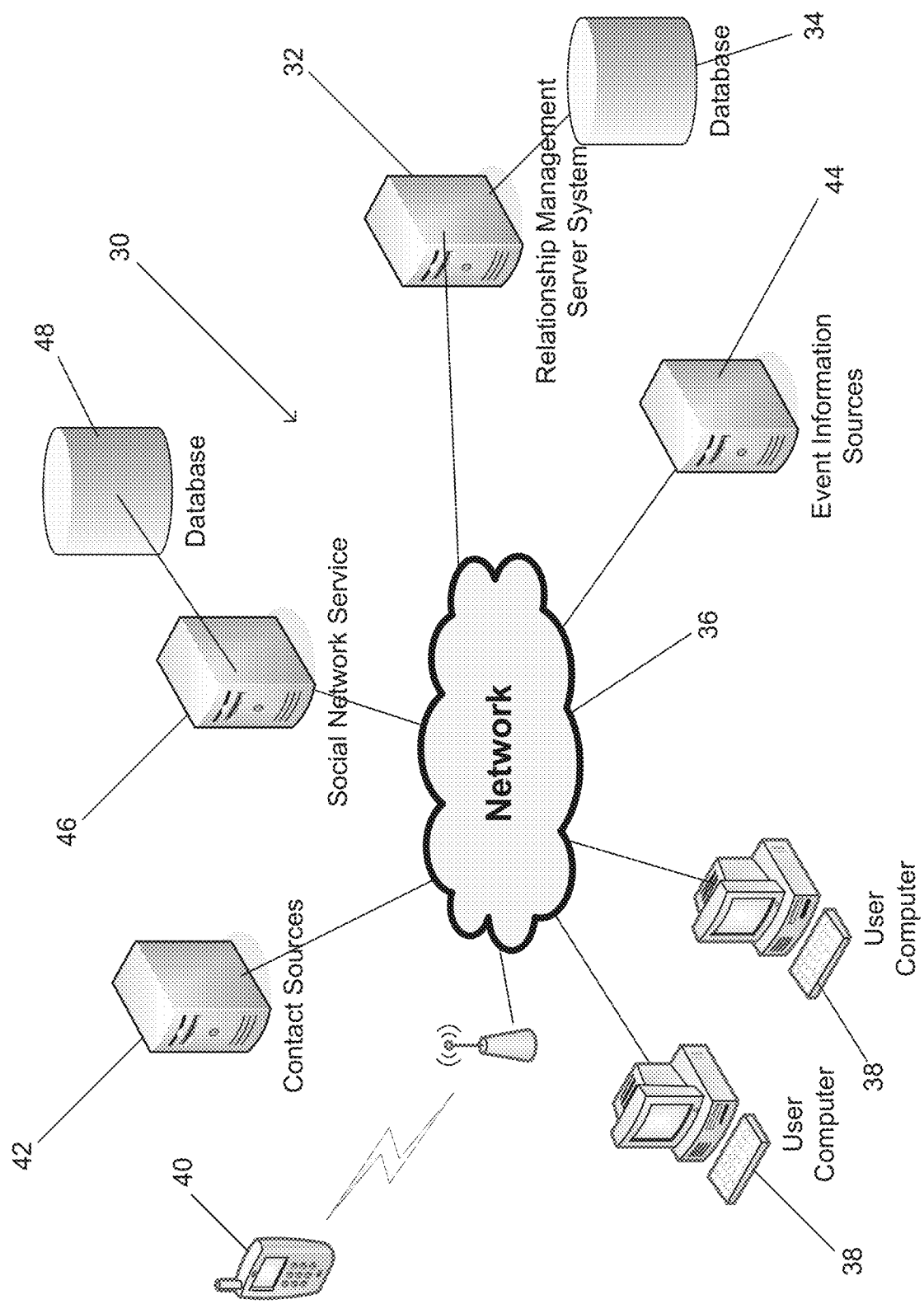
FIG. 2 is a network diagram illustrating a relationship management system in accordance with an embodiment of the invention.

A variety of system architectures can be utilized to implement relationship management systems in accordance with embodiments of the invention including (but not limited to) web services architectures. A relationship management system in accordance with an embodiment of the invention is illustrated in FIG. 2. The relationship management system 30 includes a relationship management server system 32 that is configured to build and score social graphs in the manner outlined above. The information collected by the relationship management server system 32 is stored in a database 34.

Users can communicate with the relationship management server system via a network 36 using one of a plurality of different classes of user device including but not limited to computers 38 and mobile phones 40. The relationship management server system 32 can also collect information concerning a user's contacts and events involving the contacts from one or more contact sources 42 and event information sources 44. The collected information is utilized by the relationship management system to construct one or more scored social graphs with respect to each user and the user's contacts. As is discussed further below, the relationship management system can also analyze the scored social graph. In many embodiments, the relationship management server system is configured to provide recommendations with respect to interacting with specific contacts based upon objectives defined by the user. In several embodiments, the relationship management server system is configured to index metadata collected concerning contacts and events and provides the ability to search for people relevant to a specific topic or objective. In other embodiments, the analysis performed by the relationship management server system is only limited by the requirements of a specific application and the capabilities of the server system.

In many embodiments, the relationship management system is integrated with one or more services enabling the services to retrieve information for the relationship management system. For example, the LinkedIn service provided by LinkedIn, Inc. can be integrated with a relationship management system to retrieve relationship scores for display on a user profile within the LinkedIn service. In other embodiments, any of a variety of services can be integrated with a relationship management system in accordance with embodiments of the invention.

Extending CRMs to Include Relationship Management

Relationship management systems can be implemented as separate systems that aggregate contact and event information. In many embodiments, the relationship management system is implemented as an extension to a CRM system. When a relationship management system extends a CRM system, the relationship management system typically relies upon the CRM system to aggregate contact information and event information. The relationship management system simply provides an API via which the CRM system can pass aggregated information to a scoring engine. The scoring engine can then return one or more scores for an individual relationship and/or a scored social graph.

Figure 2A:
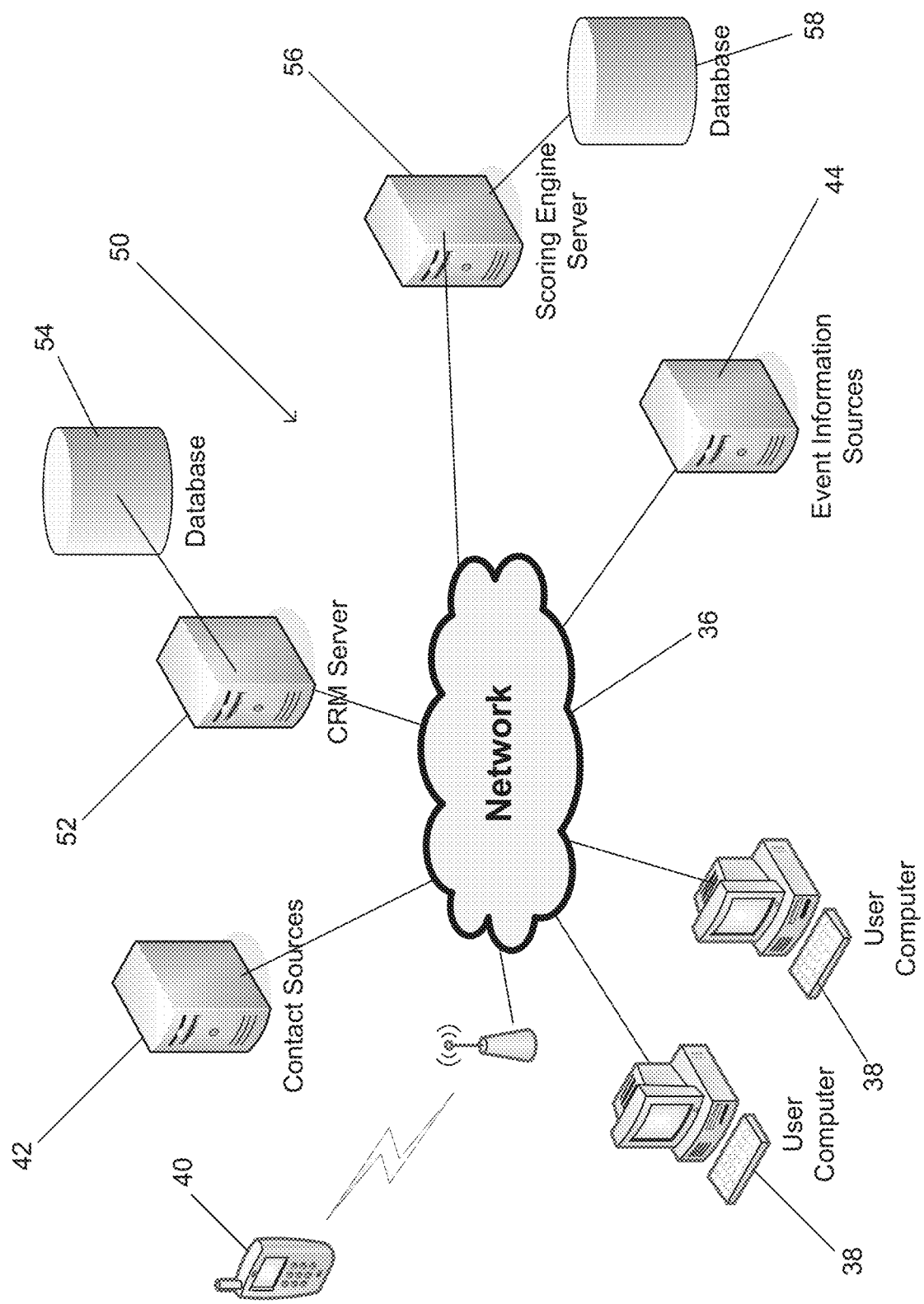
FIG. 2A is a network diagram illustrating a relationship management system implemented in combination with a CRM system in accordance with an embodiment of the invention.

A relationship management system configured to extend a CRM system in accordance with an embodiment of the invention is illustrated in FIG. 2A. The relationship management system 50 includes a CRM server 52 and an associated database 54 connected to a network 36. The CRM server communicates with user computing devices 38 and user mobile devices 40 via the network 36. The CRM server 52 can obtain contact information directly from user devices and/or indirectly from other sources of contact information 42 including but not limited to the sources of contact information discussed above with respect to FIG. 1. The CRM server 52 can also obtain event information directly from user devices and/or indirectly from other sources of event information 44 including but not limited to the sources of event information discussed above with respect to FIG. 1. In the illustrated embodiment, a scoring engine server 56 and associated database 58 are also connected to the network 36. The CRM server 52 can provide a stream of event information to the scoring engine server 56 in order to obtain relationship scores. In a number of embodiments, the CRM server can provide a stream of event information related to a specific relationship and the scoring engine server evaluates the event information and scores the relationship. In several embodiments, the CRM server provides a stream of contact information and event information related to the contacts. The scoring engine can use the contact information and event information to build a scored social graph. The scored social graph can then be provided to the CRM server in its entirety. Alternatively, the scoring engine can utilize the scored social graph to provide specific relationship scores to the CRM server, and/or recommendations relevant to specified user objectives. Scoring of relationships and generation of recommendations in accordance with embodiments of the invention are discussed further below.

Relationship Management System Software Architecture

Figure 3:
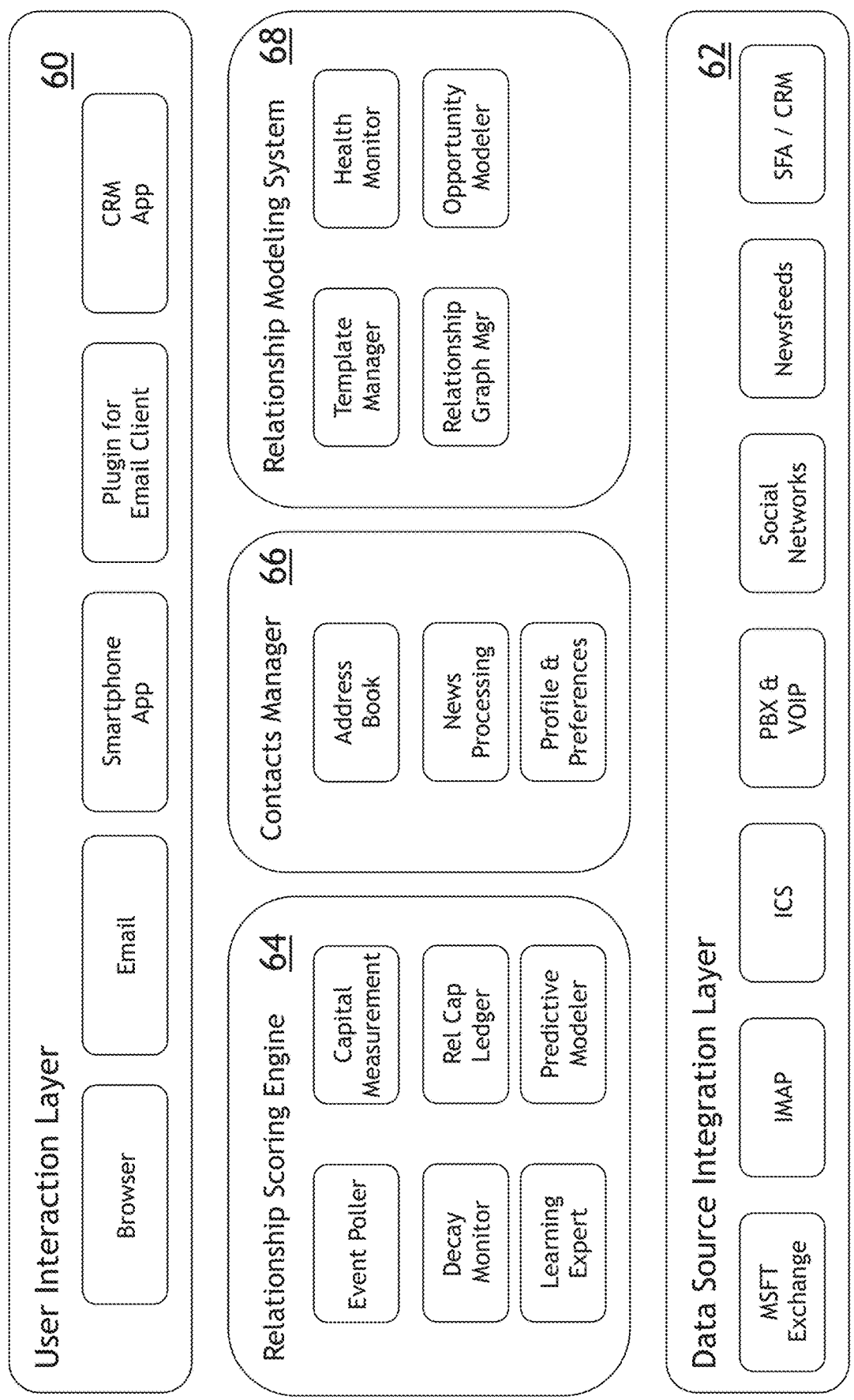
FIG. 3 is a software diagram illustrating components of a relationship management system in accordance with an embodiment of the invention.

Relationship management systems in accordance with embodiments of the invention can be implemented using a variety of software architectures appropriate to a specific application. A relationship management system software architecture in accordance with an embodiment of the invention is illustrated in FIG. 3. In the illustrated embodiment, the relationship management system software includes various modules including a user interaction layer 60, a data source integration layer 62, a relationship scoring engine 64, a contacts manager 66, and a relationship modeling system 68. In many embodiments, the contact manager 66 manages the data from the contacts integrated by the relationship management system, and the relationship scoring engine 64 scores event information with respect to specific contacts. The scored events can then be provided to the relationship modeling system, which constructs a scored social graph using the scored event information and the characteristics of the relationships between the user and specific contacts. Although a specific software architecture is illustrated in FIG. 3, any of a variety of architectures appropriate to a specific application can be implemented in accordance with embodiments of the invention.

Scoring Relationships

Figure 4:
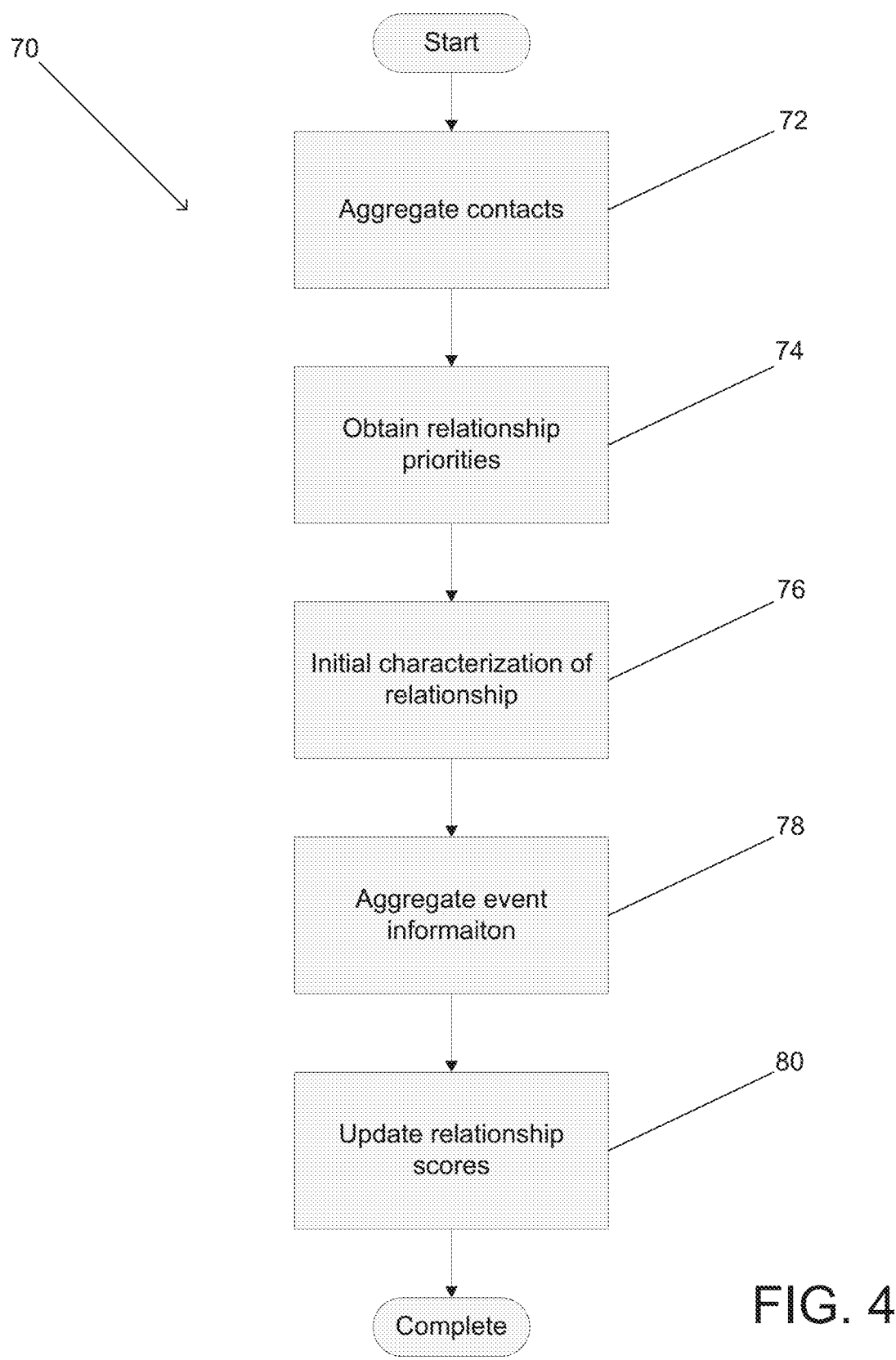
FIG. 4 is a flow chart illustrating a process for generating a scored social graph in accordance with an embodiment of the invention.

A variety of processes can be utilized in constructing and scoring a social graph in accordance with embodiments of the invention. A process for constructing and scoring a social graph in accordance with one embodiment of the invention is illustrated in FIG. 4. The process 70 involves aggregating (72) contact information to define the relationships that form the user's social graph. In many embodiments, information concerning relationship priorities is also obtained (74). In several embodiments, the information is obtained directly from the user. In a number of embodiments, recommended relationship priorities are generated based upon a user profile. The manner in which relationships can be prioritized is discussed further below.

The process 70 illustrated in FIG. 4 also involves characterizing (76) the initial characteristics of some or all of the relationships enjoyed by the user. In many embodiments, the initial characterization involves describing the type and importance of the relationship and assigning one or more initial scores to the relationship. The user can directly assign importance and relationship scores to a relationship. Alternatively, a relationship management system can automatically assign importance and/or relationship scores to relationships based upon aggregated information and/or information provided by the user and the user can modify the automatically assigned scores. In many embodiments, a relationship management system recommends relationships that will provide the most value to the relationship management system (e.g. the relationships most relevant to specific objectives identified by a user) and specifically requests that the user characterize the identified relationships. The combination of the relationship definitions and initial relationship scores constitute a scored social graph that can then be updated over time based upon events involving the user and the user's contacts.

Once one or more initial relationship scores have been assigned, the process 70 aggregates (78) event information and updates (80) the relationship scores applied to the user's social graph. In many embodiments, a relationship management system modifies relationship scores based upon the elapse of time (relationships tend to weaken over time), and aggregated event information (relationships can be strengthened or diminished based upon the occurrence of different events).

Although a specific process for constructing and updating a user's social graph in response to events involving the user and the user's contacts is illustrated in FIG. 4, any of a variety of processes can be used to construct a scored social graph in accordance with embodiments of the invention. Systems and methods of acquiring contact information, obtaining relationship priorities, initially characterizing relationships, aggregating event information, and updating relationship scores in accordance with embodiments of the invention are discussed further below.

Aggregating Contact Information and Characterizing Relationships

Figure 5:
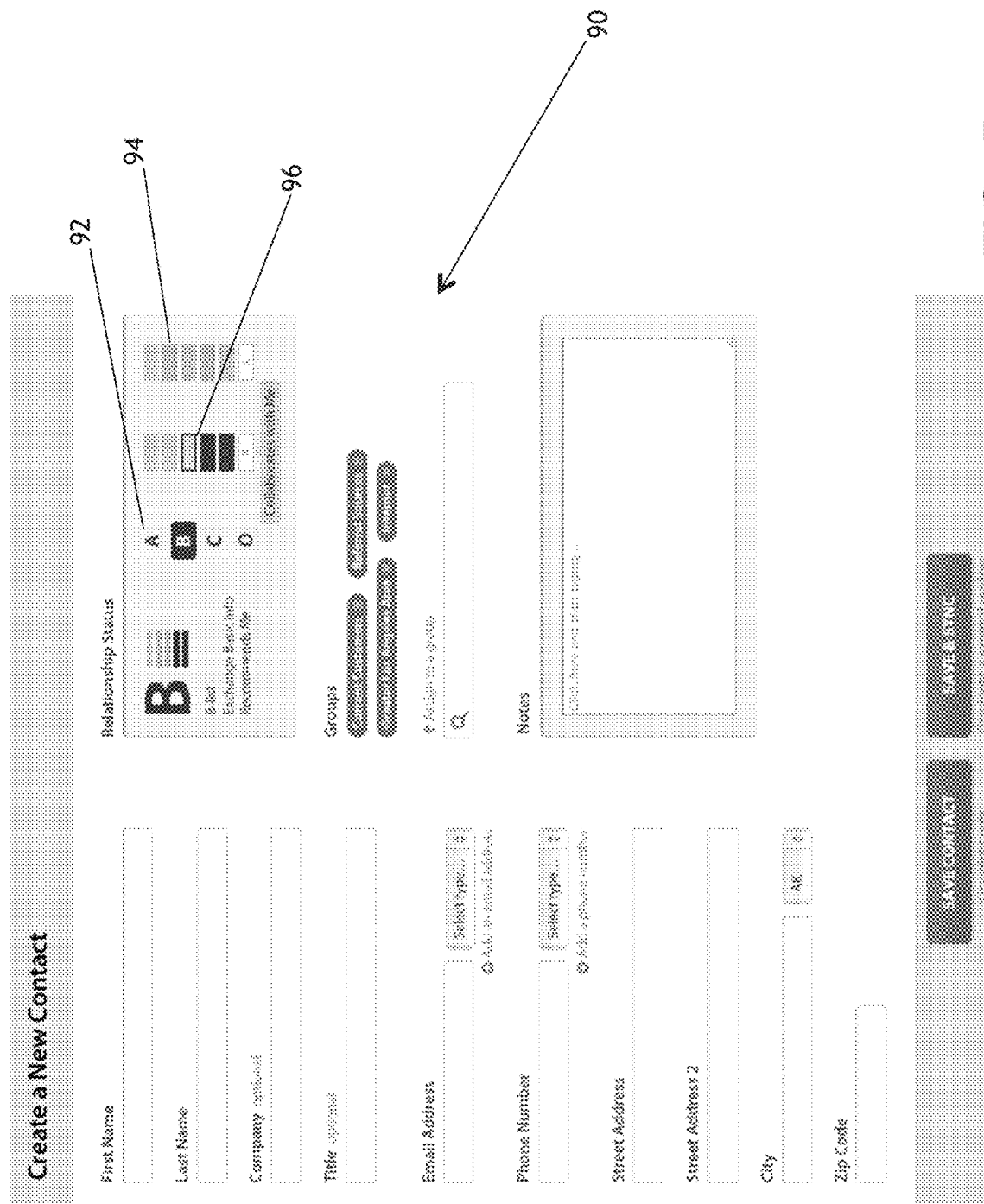
FIG. 5 conceptually illustrates a user interface for characterizing a relationship with a contact in a relationship management system in accordance with an embodiment of the invention.

Many systems including but not limited to CRM systems and online social networks support the capability of aggregating contact information. In a number of embodiments, a relationship management system can provide a user interface that enables a user to manually enter contact information and define the relationship that exists between the user and the contact. A user interface configured to enable the entry of information concerning a contact and to obtain an initial characterization of the relationship a user enjoys with the contact in accordance with an embodiment of the invention is illustrated in FIG. 5. The user interface 90 provides the ability for a user to characterize the importance of a relationship. In the illustrated embodiment, the user interface enables the user to select between a number of levels 92 representing different levels of importance. The levels are shown as the user's "A-list", "B-list", "C-list" and "Other". In other embodiments, any number and variety of groups can be utilized to indicate the importance of a contact through inheritance from its associated groups. The user interface 90 also provides mechanisms that can be utilized to score the relationship and to set an objective for the relationship. In the illustrated embodiment, the user can score the relationship by setting a level 94 from six different levels. A similar set of levels 96 is provided so that the user can specify an objective or target relationship score. The characterization of relationships is discussed further below.

Figure 6:
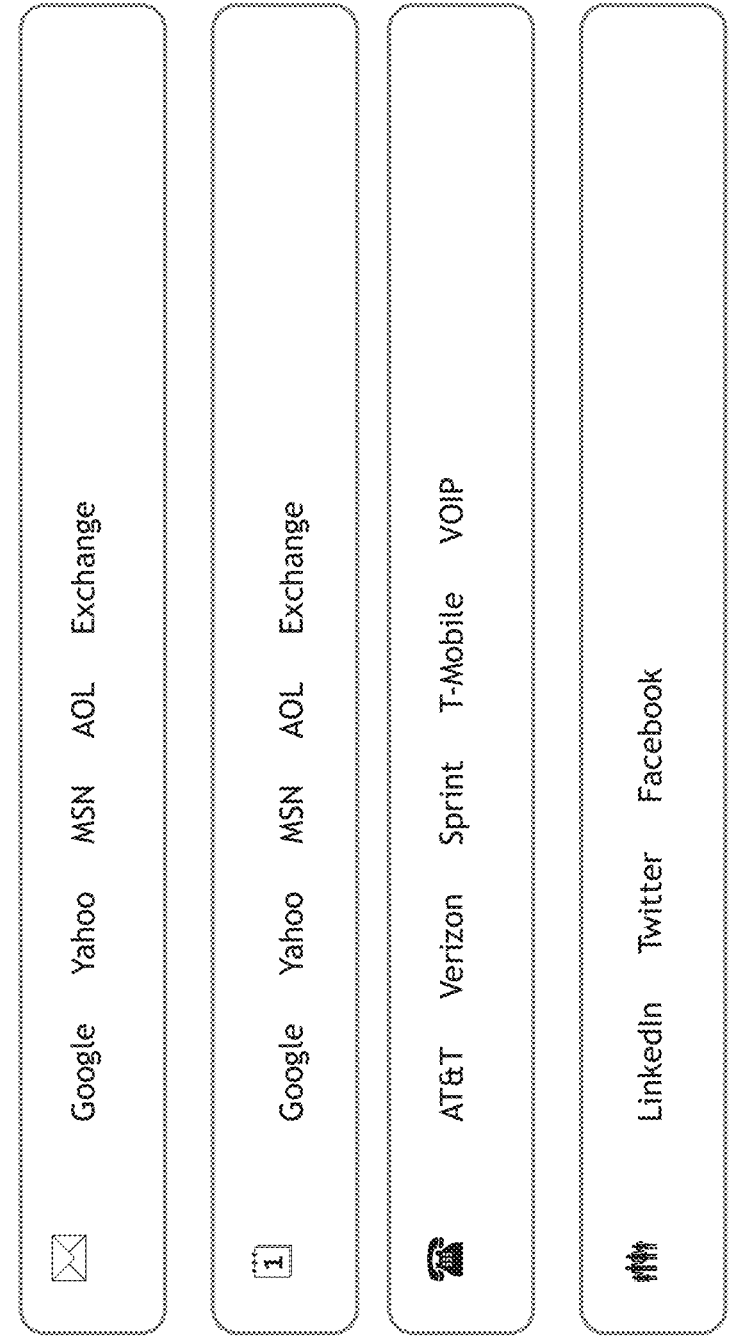
FIG. 6 conceptually illustrates a user interface for importing event information from various data sources in accordance with an embodiment of the invention.

In the user interface illustrated in FIG. 5, a user interface is illustrated that enables a user to manually provide a description of a relationship with a single contact. In many embodiments, contact information aggregated by other applications and/or services can be imported into a relationship management system by a user. A user interface that provides a user with the opportunity to enable a relationship management system to access aggregated contact and event information on other services is illustrated in FIG. 6. In the illustrated embodiment, the user is provided with a selection of mail services, calendaring services, telephone and internet phone services, and online social networking services from which information can be obtained by the relationship management system. Although specific services are shown in FIG. 6, a relationship management system is only limited in the services from which it can obtain contact and/or event information by the services themselves. Furthermore, the user interface of a relationship management system in accordance with embodiments of the invention can involve the presentation of a sequence of screens that can guide a user through the process of granting the relationship management system access to different services.

Figure 7:
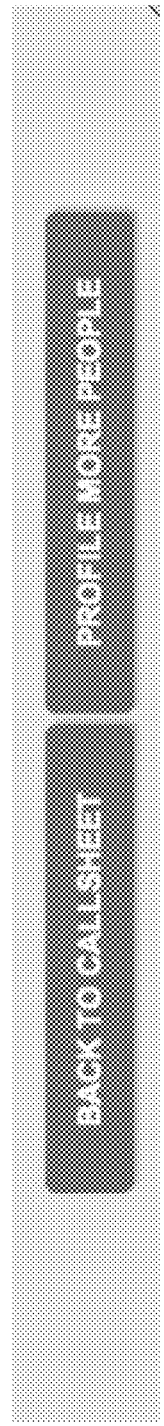
FIG. 7 conceptually illustrates a user interface for characterizing multiple relationships in accordance with an embodiment of the invention.

When a batch of aggregated contact information is imported into a relationship management system, a user will typically be presented with a user interface enabling the user to provide an initial characterization of the relationship the user enjoys with each imported contact. A user interface enabling the rapid characterization of multiple relationships in accordance with embodiments of the invention is illustrated in FIG. 7. In the illustrated embodiment, the user interface enables a user to set the importance, and current status of the relationship the user enjoys with each of the listed contacts. The user can also define a target relationship status with respect to each contact. In a number of embodiments, the list of contacts presented to the user is sorted using a smart sorting system that lists contacts in order based upon the level of interaction between the contact and the user and/or the importance of the contact to relationship objectives defined by the user. In many embodiments, the recommendation engine of the relationship management system identifies the relationships within the user's contacts that will have the largest influence on the recommendations made by the recommendation engine. In this way, the relationship management system can obtain the information that will be most influential on the recommendations provided by the recommendation engine without requiring the user to characterize the relationship of every contact in a user's contact list.

Although specific user interfaces are illustrated in FIGS. 5-7, any of a variety of user interfaces can be utilized in the aggregation of contact information and initial characterization of the relationships that a user enjoys with each contact in accordance with embodiments of the invention. The characterization of relationships and ongoing scoring of relationships are discussed further below.

Describing a Contact/Relationship Type

The type of relationship that a user enjoys with a specific contact can often depend upon the nature of the contact. In order to accommodate variance in the importance of specific contacts and the ease with which relationships can be built and/or maintained with specific contacts (i.e resistance), many relationship management systems in accordance with embodiments of the invention attempt to obtain information describing the contact or the relationship type. The information collected by a relationship management system describing a user's contacts or relationship type is typically dependent upon the requirements of a specific application.

Figure 8:
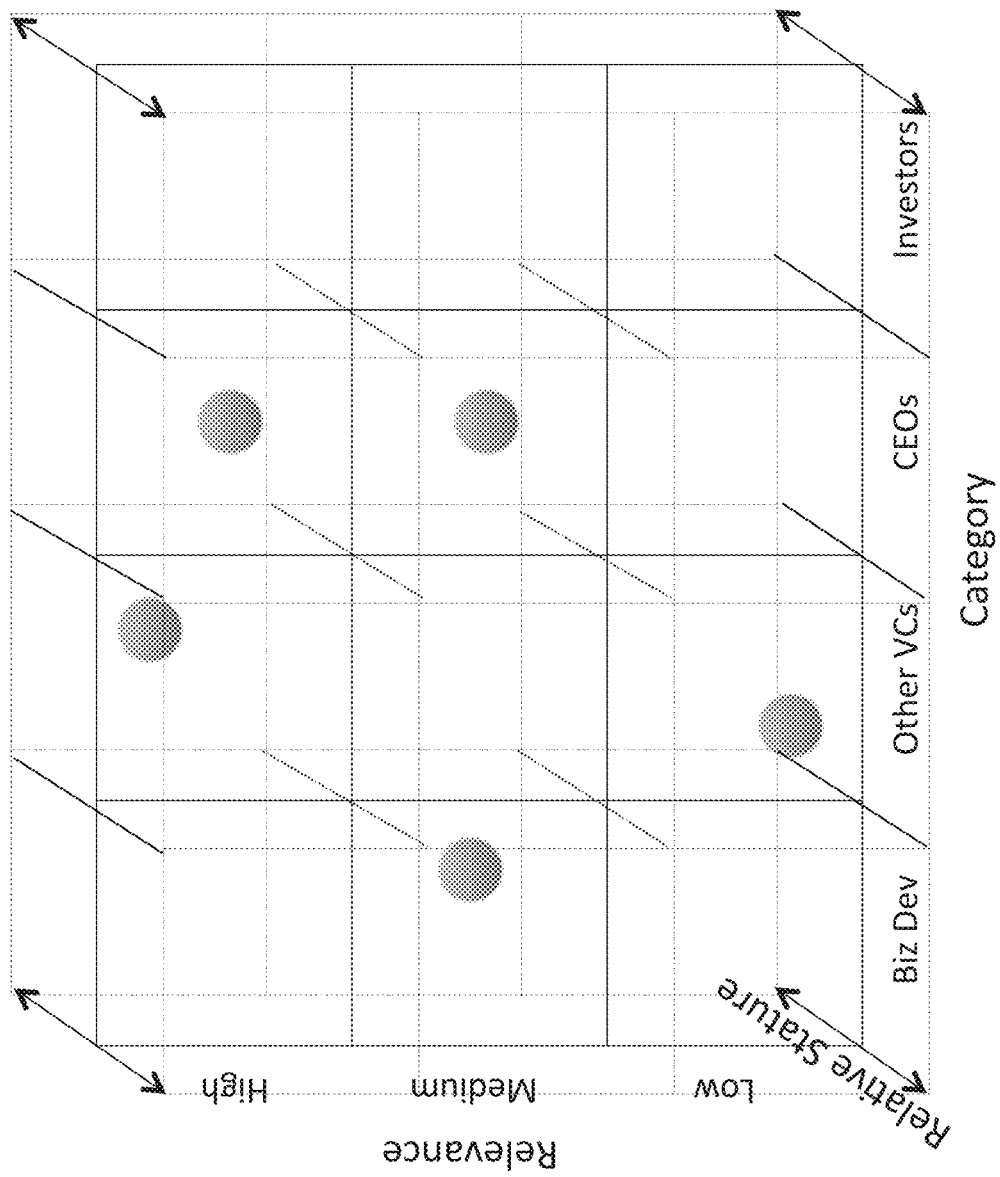
FIG. 8 conceptually illustrates the prioritization of contacts in a relationship management system in accordance with an embodiment of the invention.

A multi-dimensional framework for describing a contact in accordance with an embodiment of the invention is conceptually illustrated in FIG. 8. In the illustrated embodiment, each contact is categorized based upon relevance of the contact to a user's desired objectives (e.g. professional and/or business). In addition, the contact is further categorized based upon the relative stature of the user and the contact (i.e. whether the contact is a peer, a superior, or a subordinate of the user). In other embodiments, any of a variety of factors can be utilized to categorize contacts including but not limited to the stature of the contact within a particular category. As is discussed further below, the description of a user's contacts can be utilized by the scoring engine of a relationship management system to evaluate the significance of specific events with regard to building and/or maintaining relationships with specific contacts. Although many relationship management systems capture information describing a user's contacts for the purpose of scoring the user's social graph, a number of relationship management systems in accordance with embodiments of the invention do not differentiate between different categories of contacts and treat all contacts in the same manner for the purpose of calculating relationship scores.

Although a user can manually describe contacts, services such as LinkedIn, Google News, Twitter, CrunchBase, Jigsaw.com, and Dun & Bradstreet can provide a significant amount of publicly available information describing a contact. In many embodiments, the scores assigned to describe a contact or relationship type are automatically generated based upon publicly available information concerning the contact. Once the contact is described, the characterization of the relationship is completed by assigning one or more relationship scores to the relationship the user enjoys with the contact. The manner in which initial relationship scores can be assigned in accordance with embodiments of the invention is discussed further below.

Assigning Initial Relationship Scores

The initial characterization of a relationship involves assigning one or more initial relationship scores to the relationship. In many embodiments, initial relationship scores are manually assigned by a user. In a number of embodiments, the initial relationship scores can be selected from a list such as, but not limited to, the following list:

1—Basic Contact
2—Knows My Name
3—Exchanges Basic Information with Me
4—Collaborates with Me
5—Recommends Me
6—Promotes Me The above categories enable a user to translate real world understandings of the relationship between the user and the contact into one or more numerical scores that can be provided to a scoring engine. In many embodiments, the stages of the relationship are non-linear. In other embodiments, any of a variety of techniques can be used for defining possible relationship scores within a relationship management system including but not limited to scores selected from a continuum and/or different lists of quantized relationship characterizations. In several embodiments, the initial relationship scores and the ongoing relationship scores are quantified, however, the ongoing scores assigned to the relationship are determined on a continuum by the scoring engine. In many embodiments, the initial relationship scores are generated automatically based upon a historical analysis of aggregated event information.

Characterizing Relationships Based Upon User Priorities

Relationship management systems in accordance with embodiments of the invention can be customized based upon the priorities of an individual user. In several embodiments, the relationship management system solicits information from a user concerning the relationships that the user prioritizes. Based upon the user's priorities, the relationship management system can automate some of the scoring utilized in describing individual contacts. In addition, the relationship management system can provide relationship target recommendations based upon the user's priorities.

Figure 9A:
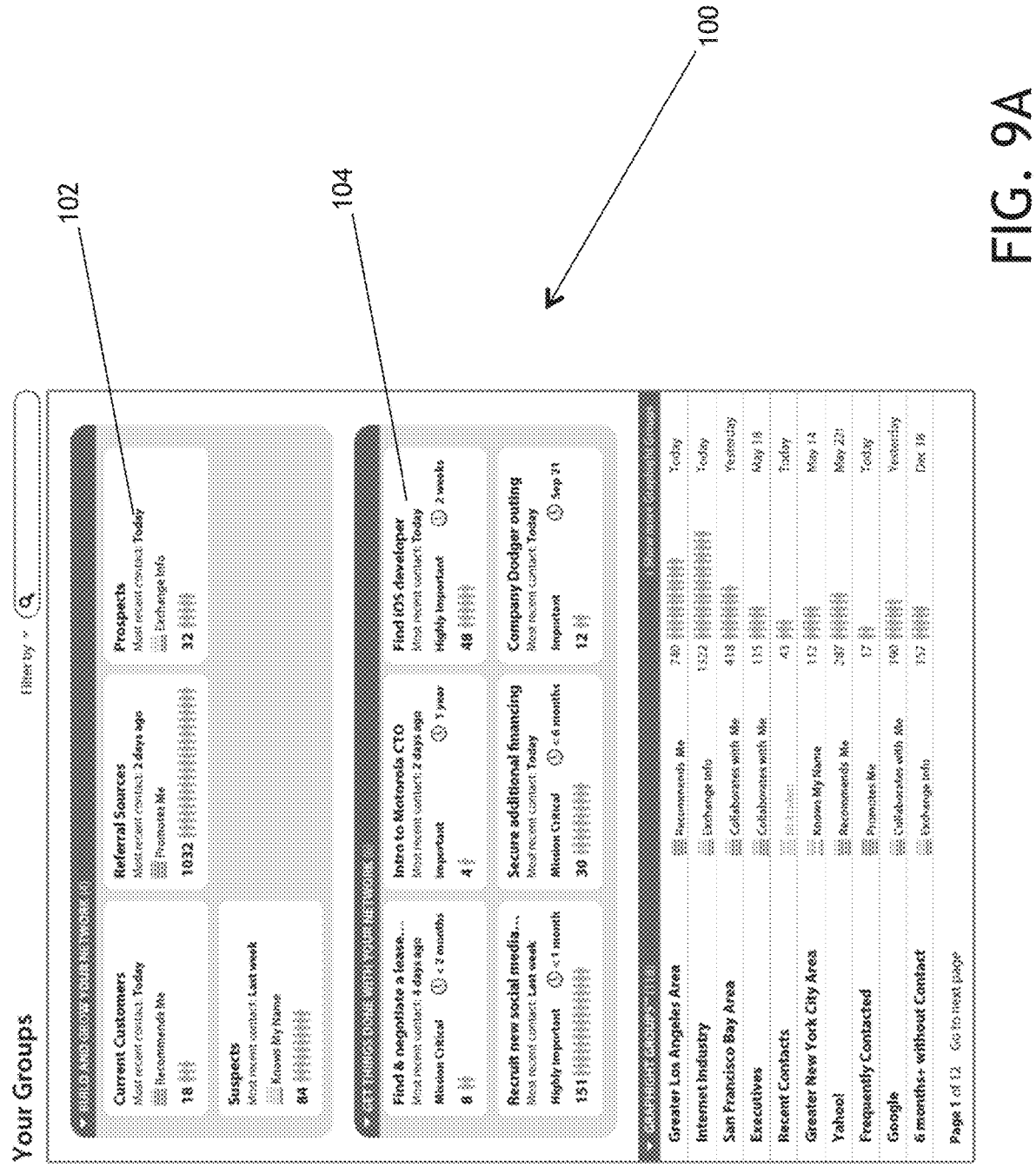
FIG. 9A conceptually illustrates groups of contacts formed within a relationship management system in accordance with an embodiment of the invention.

In a number of embodiments, a relationship management system enables a user to define groups of contacts with respect to specific objectives. The groups can be defined with respect to a general objective such as (but not limited to) building and growing a network, and/or a specific objective or task that leverages contacts within the user's network. A conceptual illustration of a user interface generated by a relationship management system illustrating different groups of contacts created by a user in accordance with embodiment of the invention is illustrated in FIG. 9A. The user interface 100 includes a number of groups 102 of contacts defined by a user that identify contacts that are important to objectives related to building and growing the user's network. In the illustrated embodiments, the groups are "Current Customers", "Referral Sources", "Prospects" and "Suspects". In other embodiments, any of a variety of groups can be defined related to building and growing a user's network. The user interface 100 also includes a number of groups 104 of contacts defined by the user with respect to specific tasks where the basis of engagement with the contacts in the group is achieving a specific stated goal rather than merely developing the user's network (although engagement in this way typically strengthens relationships). In the illustrated embodiment, the groups of contacts include "Find iOS developer" and "Secure Additional Financing".

Figure 9B:
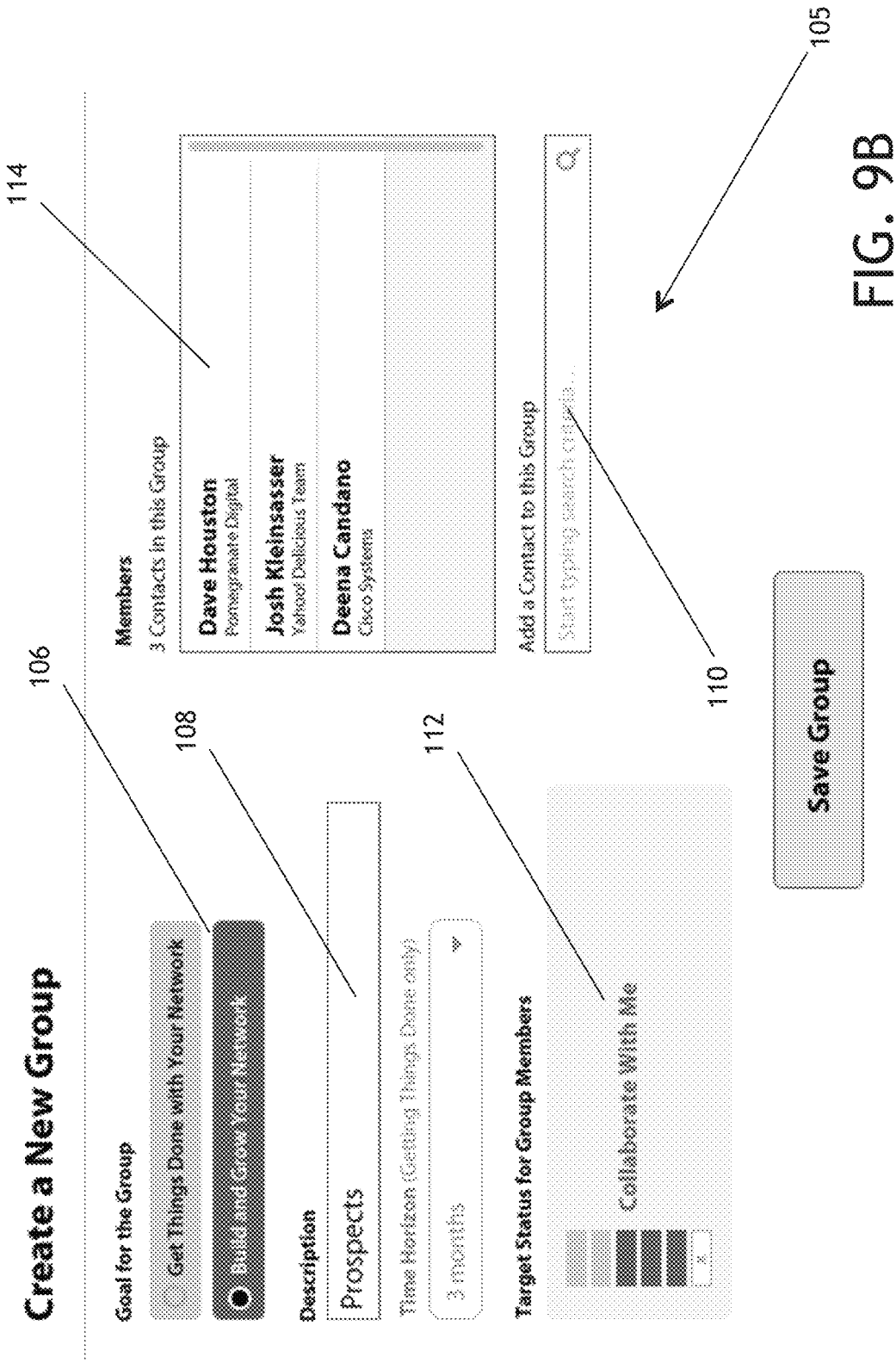
FIG. 9B conceptually illustrates a user interface for creating a new group of contacts in accordance with an embodiment of the invention.
Figure 9C:
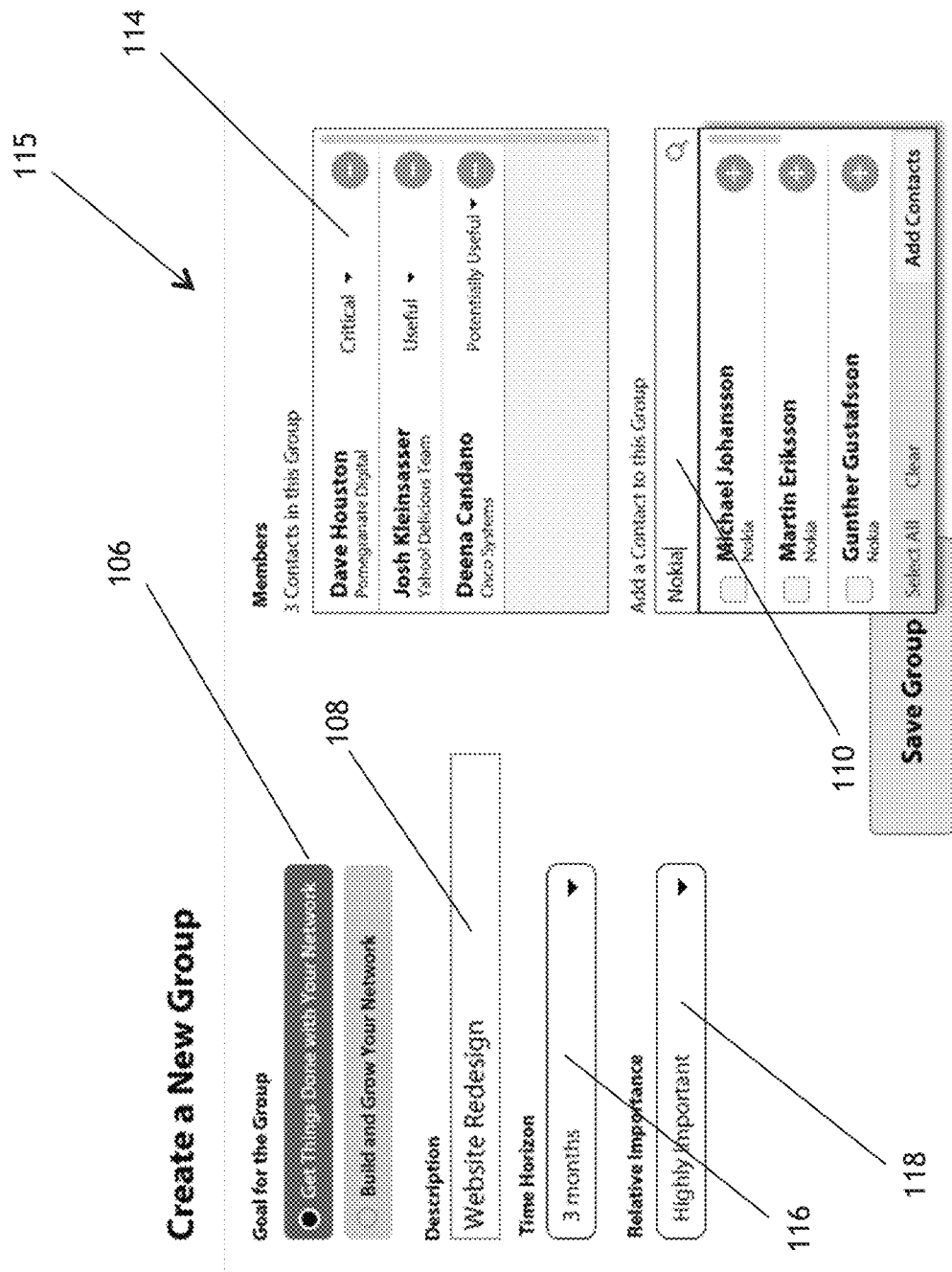
FIG. 9C conceptually illustrates a user interface for creating a new group of contacts related to a project in accordance with an embodiment of the invention.

User interfaces that can be used to create the different types of groups referred to above are conceptually illustrated in FIGS. 9B and 9C. A user interface 105 is shown in FIG. 9B that can be used to create a group of contacts for the purpose of building the user's relationship with the contacts. The user interface 105 includes a mechanism 106 for selecting that the purpose of the group is to grow the user's network. The user interface includes a text box 108 for naming the group, and a text box 110 for adding contacts to the group. The user interface 105 lists 114 the contacts that are members of the group and provides a mechanism 112 for defining a relationship objective or target for the members of the group. The user interface 115 shown in FIG. 9C is similar to the user interface 105 shown in FIG. 9B with the exception that the user interface 115 is used to create a group of contacts related to the completion of a task or project. When the mechanism 106 is used to select that the group is being created for the purpose of completing a project, the user interface 115 provides a mechanism 116 to specify the time horizon for the project and a mechanism 118 for specifying the importance of the project. As can readily be appreciated, the groups that can be defined are only limited by the requirements of a specific user.

Once groups are defined, the relationship management system can generate recommendations specific to the objectives of the group (whether relationship targets or project objectives) in addition to recommendations related to achieving target relationship scores. In addition, the recommendation engine can also suggest individuals that should be included in the group based upon searchable metadata or similarities with members of the group or information concerning the group's objective (identifying contacts relevant to specific topics is discussed further below). In many embodiments, the relationship management system enables the user to assign priorities to groups and/or specify time horizons for the objective underlying the group so that the recommendation engine can prioritize its recommendations accordingly. In other embodiments, any of a variety of information can be provided to characterize the importance of groups for the purpose of providing input to the recommendation engine of the relationship management system.

When a user provides information concerning the relationships that the user prioritizes either directly or by placing a contact within a group, the information can be utilized by the relationship management system to recommend actions that can be taken to advance the user's relationship priorities. In addition, the relationship management system can assign multiple scores to each relationship, where each score is indicative of the importance of the relationship to a specific objective. Once the user's priorities are known to the relationship management system, the relationship management system can identify relationships that are aligned with the user's priorities and assign recommendations to contacts accordingly. In addition to defining the importance, or a similar characteristic, of a contact, the relationship management system can also recommend target relationship scores for the relationship that the user enjoys with the contact. The manner in which the initial characterization of relationships and relationship score targets are utilized by relationship management systems in the ongoing scoring of a user's social graph and with the generation of recommendations are discussed further below.

Updating Relationship Scores

A variety of models can be utilized to characterize a relationship for the purpose of scoring the relationship between a user and a contact in a relationship management system in accordance with embodiments of the invention. In general the strength of a relationship is impacted by events involving the user and the user's contact. Certain types of event foster relationships, such as communication. Other types of events can diminish a relationship. For example, in a professional context a request by the user for a referral can marginally diminish the relationship. Scoring engines in accordance with embodiments of the invention consider the effect of different types of events when scoring relationships. In addition, scoring engines can also model certain "natural" phenomena such as the tendency for relationships to naturally diminish over time. Although specific examples of relationship models are discussed below, the manner in which relationship management systems in accordance with embodiments of the invention can score relationships is only limited by the information concerning the relationship available to the relationship management system.

Figure 10:
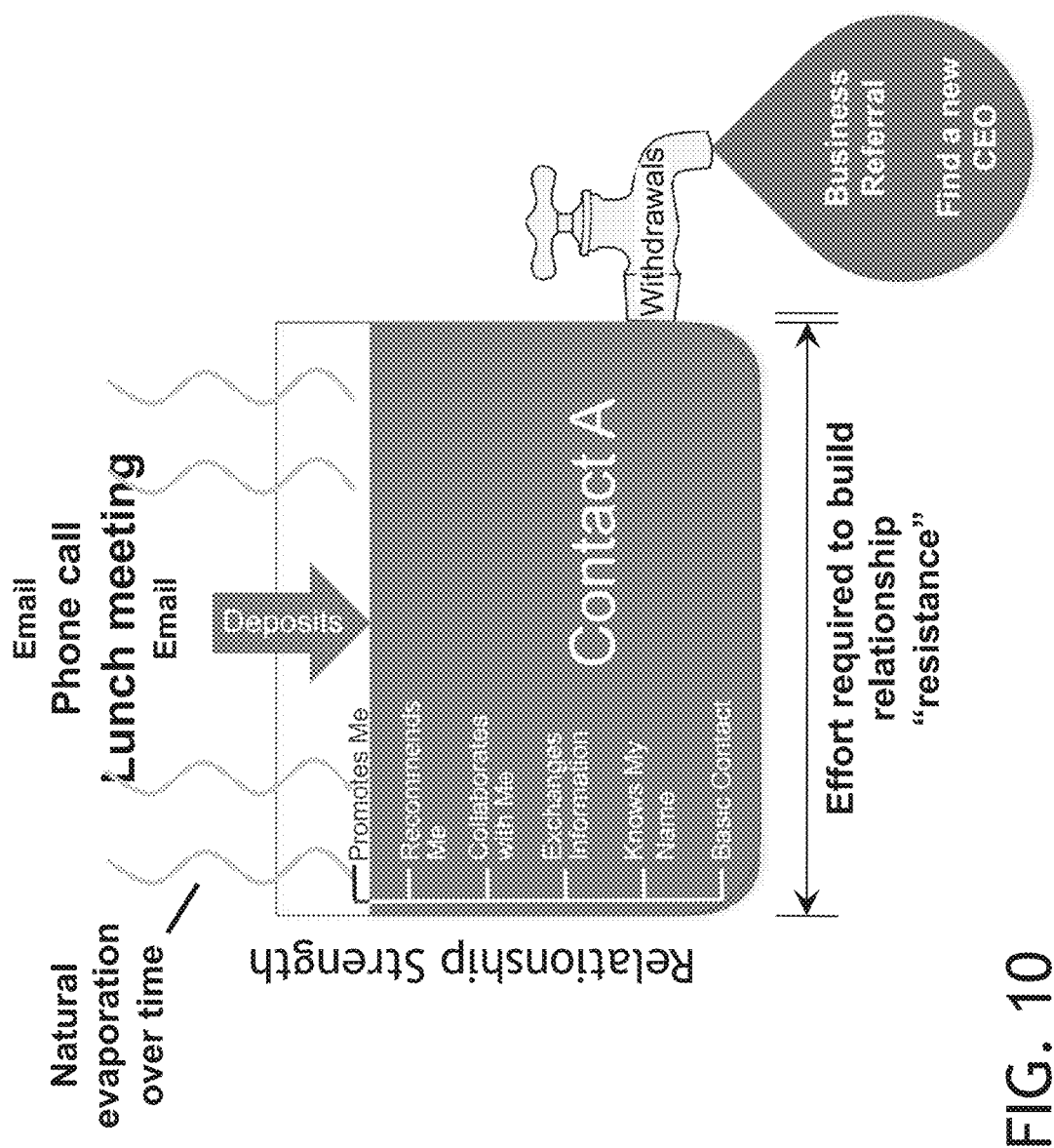
FIG. 10 conceptually illustrates factors influencing a relationship score calculated in accordance with an embodiment of the invention.

A conceptual illustration of a relationship model in accordance with an embodiment of the invention is shown in FIG. 10. In the illustrated embodiment, the analogy of a vessel full of liquid is used to model the relationship. The height of the liquid is indicative of the strength of the relationship. A variety of events can strengthen a relationship, including but not limited to a person meeting and/or the user providing a benefit to the contact, and these can be considered to add fluid to the vessel. As noted above, certain events can diminish a relationship, including but not limited to the user requesting a benefit from the contact, and these can be considered to be outflows of fluid from the vessel. In addition, the natural weakening of relationships over time is conceptually illustrated as evaporation. The effort required to build a relationship can vary based upon the individual with whom the user is trying to build a relationship. This variance can be described as the concept of resistance, which is represented by the diameter of the vessel in FIG. 10. That is, the extent to which there is resistance to developing a stronger relationship with a specific contact. Factors that can influence resistance include, but are not limited to, the relative stature of the contact, the relevance of the contact to the user, and the size of the contact's social network. In many embodiments, the relationship management system utilizes aggregated information and/or information provided by users to assign a relationship matching score indicative of alignment in such things including (but not limited to) values, interests, and/or hobbies. Once determined, the relationship matching score can be utilized in determining resistance and in identifying relationships that are likely to more rapidly advance a user's priorities or the propensity of that relationship to reach the highest levels. The varying resistance to building and maintaining relationships with different contacts is conceptually illustrated in FIG. 11. The area of the base of each vessel indicates the resistance of the corresponding contact.

Figure 11:
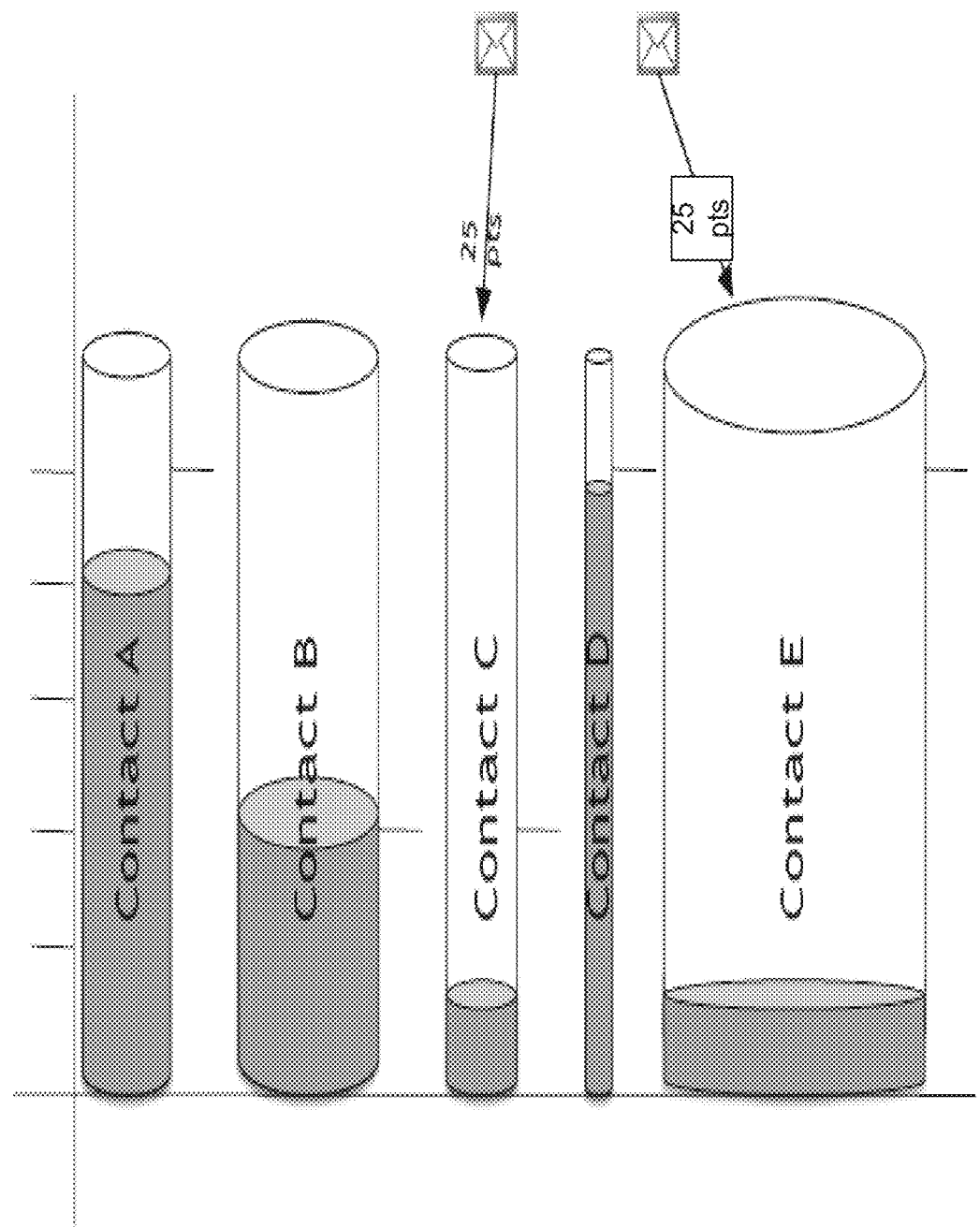
FIG. 11 conceptually illustrates the different levels of resistance individual contacts may have to building a relationship.

Although scoring engines typically do not model relationships and aggregated event information as fluids, the model illustrated in FIGS. 10 and 11 is analogous to many of the models that can be utilized by scoring engines in accordance with embodiments of the invention. In many embodiments, the scoring engine of a relationship management system utilizes a scoring function as follows:

$$s_{x,y,t} = f\left(s_{x,y,0}, \sum_{k=0}^{t} \sum_{j_k} a(s(e_{j_k}(k)), e_{j_k}(k), t-k)\right)$$

where, $s_{x,y,t}$ is the relationship score for the relationship between the user x and contact y at time t, $s_{x,y,t}$ can be a vector quantity, $e_{j_k}(k)$ is the $j_k$ th event to occur between time t=k−1 and time t=k, the function s(.) scores the value of event $e_{j_k}(k)$, the function α(.) ages the score assigned to the event $e_{j_k}(k)$ that occurred at time interval k based upon the score assigned to the event $s(e_{j_k}(k))$, the type of event $e_{j_k}(k)$, and the time t−k that has elapsed since the event occurred, and the function f(.) is a function of the initially assigned relationship score $s_{x,y,0}$, the sum of the aged event scores for all events $j_k$ that occurred at every time interval from time k=0 to time k=t involving the user x and contact y.

In the model described above, each score assigned to an event is separately aged over time in a manner that is dependent upon the type of event and the amount of time that has elapsed. In many embodiments, computational complexity is reduced by utilizing a model that determines the current relationship scored based upon aging of the most recent relationship score(s) and the sum of the scores assigned to the events that occurred since the most recent relationship score(s) was calculated.

In other embodiments, a variety of relationship models are utilized that score relationships based on various factors that can include one or more of the factors illustrated in FIGS. 10 and 11 and/or one or more of the factors described above with respect to the function f(.) above. Processes for assigning values to specific events when scoring relationships in accordance with embodiments of the invention are discussed further below.

Scoring Events

The manner in which events are scored by a relationship management system in accordance with embodiments of the invention typically depends upon the event information aggregated by the relationship management system. In a number of embodiments, the relationship management system aggregates metadata describing events in addition to aggregating information concerning the mere occurrence of the events. The metadata available to the relationship management system can be utilized in any of a variety of ways to assign scores to individual events. In a number of embodiments, the weighted value of a specific event is determined by assigning predetermined values to various pieces of metadata associated with the event. In several embodiments, metadata weights are refined over time based upon observing the manual modifications users make to the relationship scores calculated by the scoring engine.

As is discussed further below, relationship management systems in accordance with embodiments of the invention can solicit feedback concerning events and relationship scores as a way of refining the overall effectiveness of the scoring engine. In a number of embodiments, the value assigned to a specific type of event is modified based upon a user supplied event outcome score, an event memorability/ intimacy score, and/or an event outcome score. In several embodiments, information is only solicited to refine the score(s) assigned to high value events. In other embodiments, the event outcome score and the event intimacy score can be automatically determined by the relationship management system based upon aggregated metadata concerning the event. As is discussed further below, the event outcome score and event intimacy score can be manually entered and/or modified by the user. In many embodiments, various factors indicative of the outcome of an event can be expressed as an aggregated event quality score. In other embodiments, the value assigned to a specific event is calculated based upon the factors relevant to a specific application including but not limited to functions similar to those outlined above.

Factoring Subjective Information Into Relationship Scores

In many embodiments, the relationship management system solicits subjective information concerning events from the user in order to improve the correspondence between the user's scored social graph and the user's social network. In several embodiments, the relationship management system utilizes aggregated information concerning events to send prompts to the user to provide additional subjective information concerning events to assist the scoring engine in assigning a value to the event. In addition, the system can periodically request that the user confirm relationship scores assigned to a contact to further verify the correspondence between the user's scored social graph and the user's social network. In a number of embodiments, an application on a smart phone and/or SMS messages are utilized to solicit subjective information from the user. In other embodiments, any of a variety of techniques can be utilized to solicit subjective information from the user. Once the subjective information has been obtained, the scoring engine can incorporate the additional information into the scoring process and assign one or more revised relationship scores accordingly. In addition, the scoring engine can periodically update various event metadata weightings utilized by the system to conform the scores assigned by the scoring engine to the user's experience.

Recommendations Based Upon User Priorities

Relationship management systems in accordance with embodiments of the invention can be utilized to provide analysis and/or recommendations based upon a user's scored social graph and user defined priorities. As discussed above, relationship management systems can make simple recommendations based upon user defined priorities such as providing recommendations concerning the importance of specific contacts and the establishment of relationship targets with respect to specific contacts. The recommendations that can be provided by a relationship management system in accordance with embodiments of the invention are not, however, limited to these simple recommendations. In many embodiments, the relationship management system provides recommendations concerning activities with specific contacts that will maintain or elevate relationships to desired target levels. As noted above, the recommendations can also relate to activities that can advance specific objectives associated with a group of contacts.

Defining Relationship Targets

Figure 12:
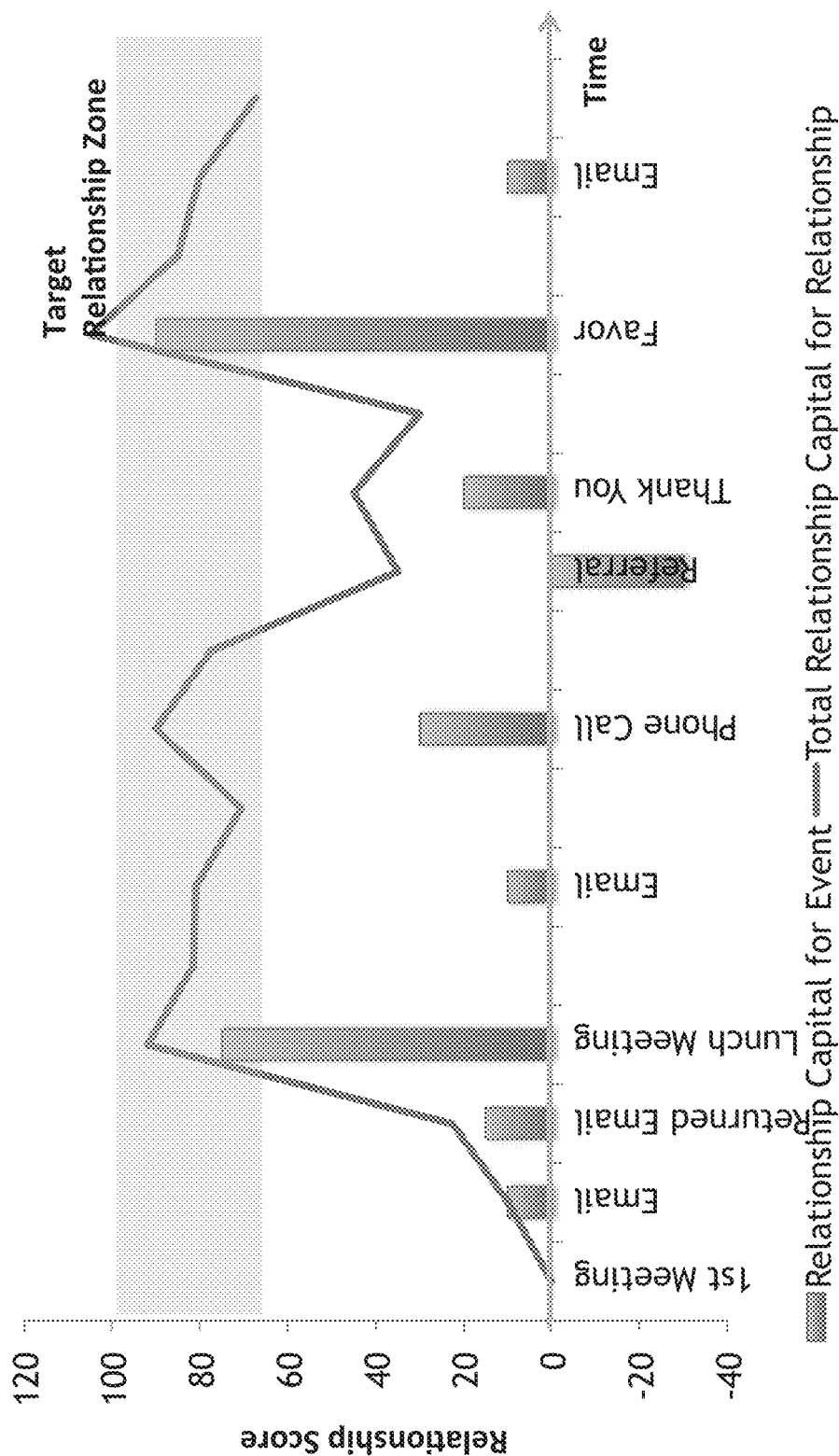
FIG. 12 is a graph conceptually illustrating the impact of different events over time on a relationship score calculated in accordance with an embodiment of the invention.

The relationship score(s) assigned to a relationship by the scoring engine of a relationship management system in accordance with embodiments of the invention will typically fluctuate over time based upon the occurrence of various events. The fluctuation of a relationship score over time in response to different events is illustrated in FIG. 12. Relationship targets can be defined for specific relationships. In the illustrated embodiment, a relationship target zone is indicated and a relationship management system can compare the relationship score to the target relationship score zone and provide recommendations to a user concerning actions that can be taken to maintain the relationship in the target zone or elevate the relationship into the target zone. These recommendations can be further prioritized based upon the priorities defined by the user.

Call Sheets

Figure 13:
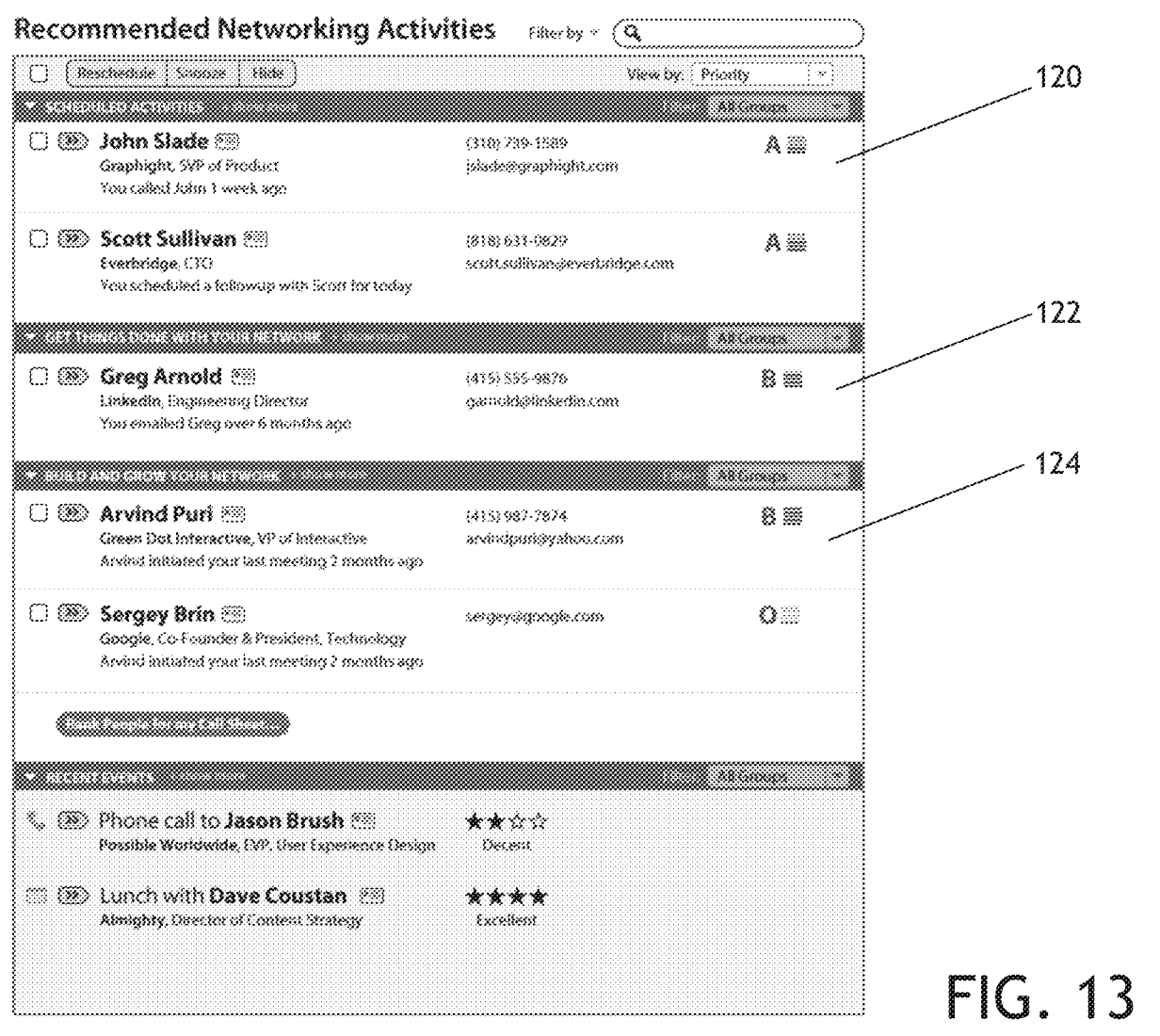

A set of prioritized actions that a relationship recommendation engine can generate may be referred to as a "call sheet". A typical call sheet indicates the actions that can be taken with respect to specific contacts in order to obtain the greatest benefit in reaching specified targets for one or more relationship scores. A user interface generated by a relationship management system showing recommended actions based upon priorities specified by a user in accordance with an embodiment of the invention is illustrated in FIG. 13. In the illustrated embodiment, the user is provided with recommendations concerning contacts with whom to communicate. The recommendations are broken down into three groups that collectively become integrated relationship management recommendations: "scheduled activities" 120, "get things done with your network" 122, and "build and grow your network" 124. The "scheduled activities" list includes activities that the user has set or are triggered by third party notifications (for instance relevant news items or anniversary events related to important contacts) and can be prioritized using any of a variety of techniques including (but not limited to) in deadline order. The "get things done with your network" group relates to recommendations generated by the relationship management system with respect to specific project groups defined by the user. In a number of embodiments, the presented recommendations are identified by sorting each recommendation generated by the recommendation engine based upon the importance assigned by the user to each of the project groups. Within each level of importance, the recommendations can be sorted based upon the relevance of a contact to the specific project and then finally based upon the elapsed time since the last event with the contact which may vary based on the nature of the last event. The "build and grow your network" group includes recommendations related to achieving longer term more strategic relationship objectives specified by the user. A variety of business intelligence rules can be utilized to select the recommendations that are presented in the call sheet including but not limited to the recommendations that will have the greatest impact on achieving the relationship objectives specified by the user. In many embodiments, the user is provided with more detailed recommendations concerning specific types of events that the user should arrange with a specific contact in order to maintain or move the user's relationship with the contact into a target relationship zone. In several embodiments, the list is ordered based upon the activities that will achieve the greatest gains or optimal yield in achieving a user's overall priorities. In other embodiments, the list can be prioritized based upon any of a number of factors including but not limited to the importance of the contact, the contact's resistance, and the distance between a desired relationship status and the current status of the relationship with the contact. In a number of embodiments, the system retrieves contemporaneous information relevant to one or more of the contacts in the list including but not limited to relevant news headlines, stock prices, and/or important dates such as a birthday or the anniversary of the founding of a company. Furthermore the user can filter the set of prioritized recommendations on the call sheet by any data or metadata present in the records of the user's contacts; for instance, the user can filter the set of prioritized recommendation by a specific geographic area in case the user will be in that area at a particular point in time. In other instances, any of a variety of filters can be utilized to prioritize a call sheet in accordance with embodiments of the invention.

Although specific examples of analytics and recommendations are discussed above with respect to FIGS. 12 and 13, any of a variety of analytic processes and recommendations can be performed by a relationship management system in accordance with embodiments of the invention based upon the data aggregated by the relationship management system and the scores generated by the scoring engine. In several embodiments, the recommendations are enhanced by conducting automated psychometric surveys of users to understand how each user best interacts with contacts. The information obtained from the survey can then be utilized by the relationship management system in selecting the types of events to recommend in order to most effectively achieve the user's stated priorities. In many embodiments, the relationship management system is configured to provide recommendations that enable users to optimize their overall scored social graph and/or their scored social graph with respect to one or more objectives. In a number of embodiments, the optimization of the social graph can be formulated as a constrained optimization problem based upon the resources (such as time) a user has available to cultivate relationships within the user's social network.

Indexing Metadata

Relationship management systems in accordance with embodiments of the invention can aggregate information concerning a contact from a variety of sources. In many embodiments, the information is indexed to enable the scoring of contacts with respect to relevance to a specific topic, keyword or search query. In this way, indexed metadata concerning contacts can be utilized to group contacts according to relevance to a specific topic or according to similarity. In many embodiments, indexed metadata concerning contacts can be searched to identify contacts relevant to a particular query. In several embodiments, the contacts returned in response to a specific query can be automatically utilized to populate a project group.

In a number of embodiments, a combination of structured data and indexed metadata can be utilized to search for contacts relevant to a specific query. For example, a natural language query such as "I am in New York for three days, who should I contact to discuss advertising strategy?" can be utilized to identify contacts within the relevant geographic location and that are relevant to the specified topic. In many embodiments, queries are parsed to identify relevant keywords and the keywords utilized to query the structured data and/or indexed metadata. Although specific examples are described above for indexing metadata and utilizing the indexed metadata. Any of a variety of techniques can be utilized for indexing metadata concerning contacts and events collected by relationship management systems and for identifying events and contacts relevant to specific queries in accordance with embodiments of the invention.

Data Mining

In addition to performing analytics based upon an individual user's social graph, relationship management systems in accordance with embodiments of the invention can perform data mining across all or a subset of users that maintain accounts with the relationship management system. In several embodiments, each user's data is stored separately and the data mining process is performed across all sets of user data. In a number of embodiments, users' data are stored as part of a single many-to-many directional social graph (i.e. connections typically are not assumed to be two-way) and the data mining processes are simply applied to the overall scored social graph.

Network Prospecting

Based upon analysis of overall user data, a relationship management system in accordance with embodiments of the invention is able to provide recommendations concerning the types of contacts that would be beneficial for a specific user based upon the user's description of themselves and specific objectives identified by the user. As with analytics and recommendations, the extent of the information that can be obtained through data mining processes in accordance with embodiments of the invention is typically only limited by the data aggregated by the relationship management system. In addition to making recommendations concerning the importance of contacts and relationship targets based upon a user's specified priorities, data mining can be performed to make recommendations concerning types of contacts from whom the user can obtain benefits that are not currently being prioritized by the user. In many embodiments, the relationship management system can identify affinity between users and compare the types of contacts that different users regard as important and with whom users have cultivated strong relationships. The effort expended in cultivating strong relationships is typically indicative of the user deriving significant benefits from the relationship. When a similar type of contact is present in a similar user's social network, then the relationship management system can make a recommendation that the user could benefit from strengthening the user's relationship with that contact. In a number of embodiments, data mining is used to provide a user with a broader template for the composition of a social network that is characteristic of someone successful within the user's field. Indeed, as is typically the case with data mining, the potential benefits that can be obtained through the analysis of the scored social graphs and aggregated event information maintained by a relationship management system is only limited by the nature of the information itself. A typical CRM does not provide relationship recommendations, but is limited to managing specific opportunities and tracking historical communication with contacts.

Workgroups and Enterprises

Although much of the above discussion focuses on the interaction between a relationship management system and an individual user, a relationship management system in accordance with embodiments of the invention can be deployed across a workgroup or an enterprise to provide team benchmarking, and a tool to support collaborative networking. For example, a team member can ascertain whether another team member has a sufficiently strong relationship with an individual to perform a desired action with respect to the individual (e.g. request a benefit or arrange a meeting that will strengthen both users' relationship with the contact). In addition, the relationship management system can provide an opportunity for an organization to monitor the progress of business development efforts that typically have not been quantifiable.

Integration with Online Social Networks

Figure 14:
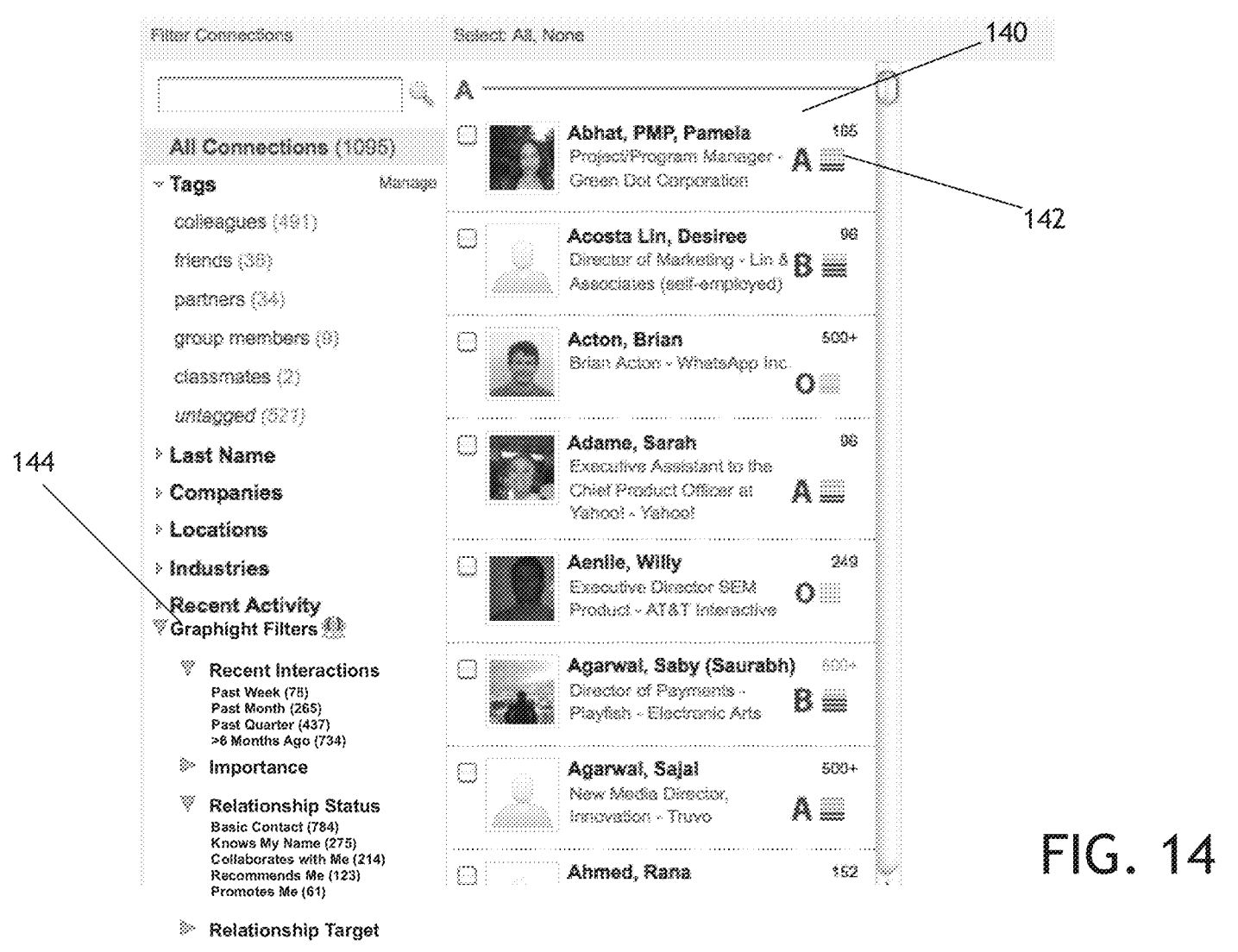
Figure 15:
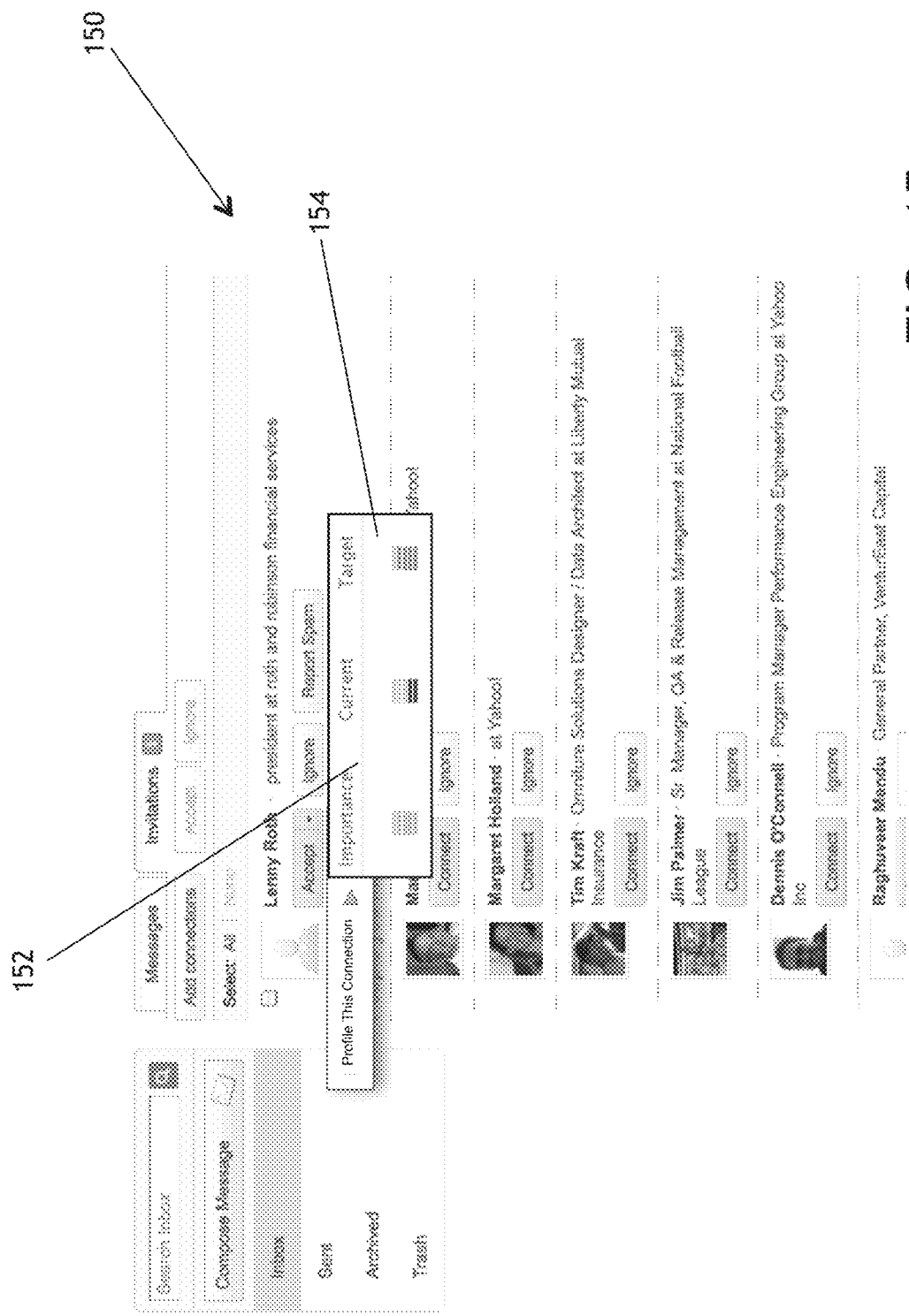
FIG. 15 conceptually illustrates the collection of relationship information via the user interface of an online social network integrated with a relationship management system in accordance with an embodiment of the invention.

As discussed above, relationship management systems in accordance with embodiments of the invention can provide an API and/or utilize the API of online social networks to provide integration between the relationship management system and the online social network. In a number of embodiments, relationship scores generated by the relationship management system can be provided to the online social network for display within the online social network. A conceptual illustration of the integration of relationship scores within a social networking service is illustrated in FIG. 14. In the illustrated embodiment, a user's contacts 140 within the social networking service are displayed and a relationship score 142 generated by a relationship management system in accordance with embodiments of the invention is integrated into the user interface. In a number of embodiments, the relationship scores are provided via an API to the social network servers for display via the user interface. In the illustrated embodiment, the relationship score includes a priority designation and an indication of the strength of the relationship. In other embodiments, any of a variety of relationship score metrics can be presented in any of a variety of different ways. In several embodiments, the relationship management system can also provide filters 144 that enable the online social network to filter contacts based upon information collected by the relationship management service. In addition to providing information to an online social network, integration with an online social network can be utilized by a relationship management system to obtain information that can be utilized in the generation of a scored social graph and/or the generation of recommendations. A conceptual illustration of the integration of a user interface with a social networking service that can be utilized by a user to characterize relationships defined within the online social network for use by a relationship management system in accordance with an embodiment of the invention is illustrated in FIG. 15. The user interface 150 includes mechanisms 152 for characterizing the relationship the user has with a contact and a relationship target 154 for the relationship. In the illustrated embodiment, the mechanism is a thermometer input for each of the relationship's importance, current relationship score and target relationship score. Although integration with a specific online social network and specific forms of integration are illustrated in FIGS. 14 and 15, relationship management systems can be integrated with any of a variety of online social networks and the integration can support any of a variety of features designed to provide and/or gather information in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A Customer Relationship Management (CRM) system, comprising:
   a CRM server system comprising at least one server having at least one processor and memory containing software; and
   a CRM database containing data describing:
      a plurality of user accounts associated with users of the CRM system;
      a plurality of user defined objectives;
      relationships between contacts and individual user accounts; and
      event information;
   wherein the at least one server in the CRM server system is configured by software to:
   search metadata associated with contacts to identify contacts relevant to a defined objective;
   generate recommendation notifications displayed to users associated with specific user accounts in the CRM database via a CRM system user interface, where the recommendation notifications specify actions the users are to take with respect to a defined objective;
   a relationship management server system extension to the CRM system comprising at least one server having at least one processor and memory containing software,
   where the at least one server in the relationship management server system extension is configured by software to:
      automatically and continuously aggregate event metadata via interfaces with at least a mail server, where event metadata is data describing events involving a user and one or more contacts;
      store event information associated with specific user accounts and contacts in the CRM database based upon the event metadata aggregated via interfaces with the at least the mail server;
      build and maintain a graph schema representing a graph of relationships between user accounts and contacts described by the data in the CRM database;
      generate a recommendation concerning an action a user associated with a user account in the CRM database is to take with respect to the defined objective based upon analysis of event metadata, including event metadata aggregated via interfaces with at least the mail server, associated with other user accounts and contacts from the CRM database identified using the graph schema; and
      provide the generated recommendation to the CRM server system.

2. The CRM system of claim 1, wherein the at least one server in the relationship management server system extension is configured by software to obtain contact information for a contact in the CRM database from at least one source of contact information and add the contact information to the CRM database.

3. The relationship management system of claim 2, wherein at least one source of contact information is selected from the group consisting of a web mail service, an enterprise mail system, and an online social network.

4. The CRM system of claim 1, wherein at least one server in the relationship management server system extension is configured by software to automatically associate at least one contact with a user account in the CRM database based upon the event metadata aggregated via interfaces with at least the mail server.

5. The relationship management system of claim 4, wherein at least one source of event information is selected from the group consisting of a web mail service, an enterprise mail system, a web calendaring service, an enterprise calendaring system, call data records, and an online social network.

6. The CRM system of claim 4, wherein the at least one server in the relationship management server system to extension is configured by software to store information identifying a group of contacts associated with at least one stored objective.

7. The CRM system of claim 6, wherein the at least one server in the relationship management server system extension is configured by software to generate a recommendation of at least one contact for inclusion in the group of contacts associated with the at least one stored objective based upon the event metadata aggregated via interfaces with at least the mail server.

8. The CRM system of claim 1, wherein the at least one server in the relationship management server system extension is configured by software to:
generate the recommendation concerning an action a user associated with a user account in the CRM database is to take with respect to at least one contact in the CRM data based upon analysis of event metadata associated with other accounts and contacts from the CRM database, and the objective.

9. The CRM system of claim 8, wherein the at least one stored objective relates to an objective with respect to at least one relationship between a user account and a contact in the CRM database.

10. The CRM system of claim 9, wherein the at least one stored objective relates to a specific relationship between a user account and a contact in the CRM database.

11. The CRM system of claim 1, wherein the at least one server in the relationship management server system is extension is configured by software to score at least one relationship between a user account and a contact stored in the CRM database based upon event metadata, including event metadata aggregated via interfaces with at least the mail server, associated with the user and the contact to create a score for a relationship within the graph schema.

12. The CRM system of claim 11, wherein the at least one server in the relationship management server system extension is configured by software to store information characterizing at least one relationship between the user account and a contact in the CRM database.

13. The CRM system of claim 12, wherein the information characterizing a relationship between the user account and a contact in the CRM system is expressed in terms of a first value indicative of the importance of the relationship to the user, and a second value indicative of the strength of the relationship.

14. The CRM system of claim 12, wherein the at least one stored objective is expressed as a target value for a strength of a relationship between a user account and a contact in the CRM database.

15. The CRM system of claim 12, wherein:
the at least one server in the relationship management server system extension is configured by software to prompt the user for information characterizing at least one relationship; and
the at least one relationship for which the user is prompted for information is selected based upon the importance of the relationship to the generation of a recommendation notification concerning an action based upon the at least one stored objective and the information characterizing the relationship between the user account and a contact in the CRM system.

16. The CRM system of claim 11, wherein the at least one server in the relationship management server system extension is configured by software to decrease a score assigned to a relationship between a user account and a contact due to a passage of time.

17. The CRM system of claim 11, wherein the at least one server in the relationship management server system extension is configured by software to increase a score assigned to a relationship between a user account and a contact in response to event metadata indicating an occurrence of a telephone conversation between the user associated with the user account and the contact.

18. The CRM system of claim 11, wherein the at least one server in the relationship management server system extension is configured by software to increase a score assigned to a relationship between a user account and a contact in response to event metadata indicating an occurrence of a meeting between the user and the contact.

19. The CRM system of claim 11, wherein the at least one server in the relationship management server system extension is configured by software to modify a score assigned to a relationship between a user account and a contact in response to the event metadata indicating that a user acted in accordance with a recommendation notification displayed via the CRM system user interface.

20. The CRM system of claim 1, wherein the at least one server in the relationship management server system extension is configured by software to generate a recommendation concerning an action a user associated with a user account in the CRM database is to take with respect to at least one contact in the CRM database based upon a score assigned to a relationship between the user account and the contact.

21. The CRM system of claim 1, wherein the plurality of sources of event metadata comprises mobile devices configured to automatically communicate with the relationship management system extension via applications installed on the mobile devices.

22. The CRM system of claim 1, wherein the event metadata is further aggregated via a phone system.

* * * * *